(12) United States Patent
NewDelman et al.

(10) Patent No.: US 12,464,976 B2
(45) Date of Patent: Nov. 11, 2025

(54) HOLLOW SHAFT INJECTION DRILLING ARRAY

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: SUB-MERGENT TECHNOLOGIES, INC., Southlake, TX (US)

( * ) Notice: Subject to any disclaimer, the term of this patent is extended or adjusted under 35 U.S.C. 154(b) by 665 days.

(21) Appl. No.: 17/876,597

(22) Filed: Jul. 29, 2022

(65) Prior Publication Data
US 2024/0032459 A1 Feb. 1, 2024

(51) Int. Cl.
*A01C 21/00* (2006.01)
(52) U.S. Cl.
CPC ................... *A01C 21/002* (2013.01)
(58) Field of Classification Search
CPC ............... A01C 21/002; A01C 21/00
See application file for complete search history.

(56) References Cited

U.S. PATENT DOCUMENTS 7,545,949 B2 * 6/2009 Mirtich .................. H04N 23/62
382/104

* cited by examiner

Primary Examiner — Christopher J. Novosad
(74) Attorney, Agent, or Firm — Bailey Legal Services, PLLC

(57) ABSTRACT

A hollow shaft injection drilling array enables sequential dispensing of a plurality of constituents at targeted depths. The hollow shaft injection drilling array includes an artificial intelligence (AI) robot (1507C); a lens (1405); a computer (1511C); a programmable logic controller (PLC) (1505C); one or more encoders (1605B); one or more limit switches (1809B); a sensor; a plurality of hollow shaft drill bits (503); a plurality of guide rail(s) (917); a plurality of matching platforms comprising elastomers (903, and 909), and granite (905); and a plurality of lead screws (913). The elastomers (903, and 909), granite (905), and the lead screws (913) enable sequential dispensing of the constituents within a plurality of different targeted depths controlled via the AI robot (1507C), the lens (1405), the computer (1511C), the PLC (1505C), the encoder (1605B), the limit switch (1809B), and the sensor. The limit switches (1809B) and the encoders (1605B) enable the hollow shaft injection drilling array to sequence the constituents to be injected at one or more specific depths.

27 Claims, 19 Drawing Sheets

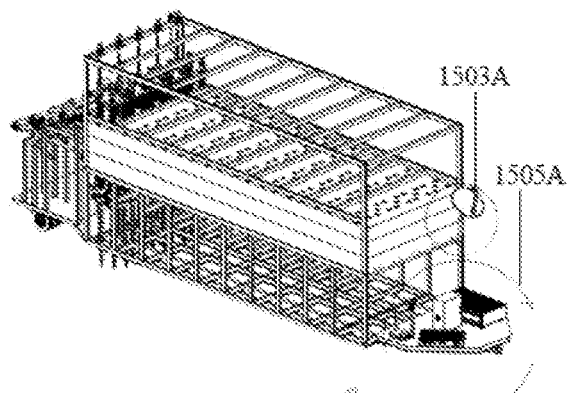
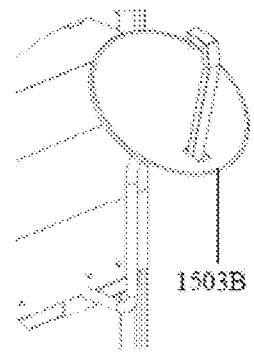
Figure 15A
Figure 15B
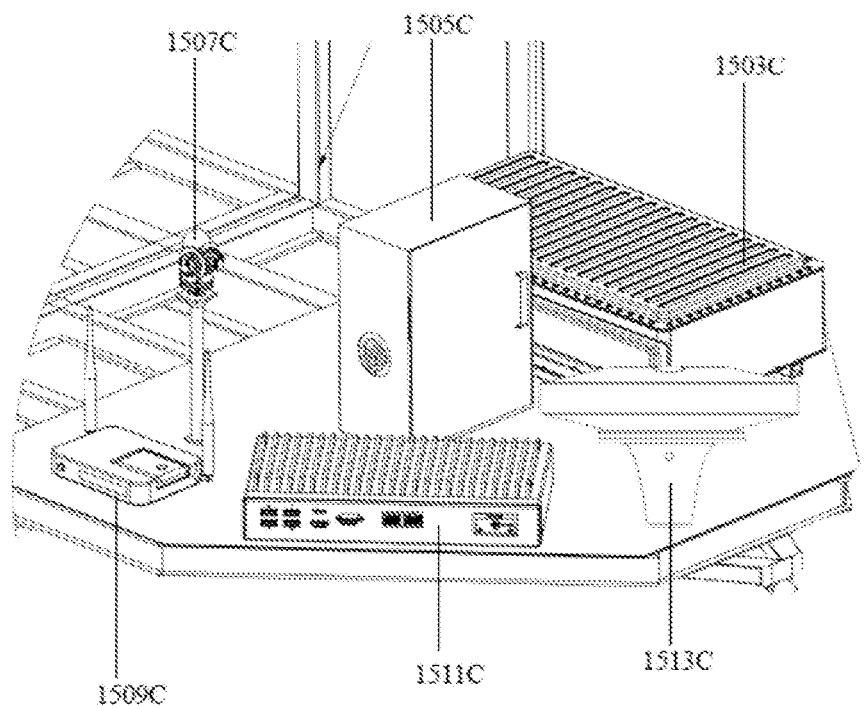
Figure 15C

HOLLOW SHAFT INJECTION DRILLING ARRAY

TECHNICAL FIELD

The present invention is generally related to soil horizon types and a sub-surface injection system. More particularly, the present disclosure relates to a hollow shaft injection drilling array to enable sequential dispensing of a plurality of constituents at targeted depths at each injection drill site.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over- or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, either organic/in-organic and/or non-organic matter, can be injected either for soil health or for water retention.

This specification recognizes that there is a need for an efficient apparatus that can inject down to various targeted root zone sections and/or at sub-rootzone soil horizons for soil health and hence enhanced yield and/or for water retention modification for drought resilience.

Soil amendments applying biochar of many varieties have been examined for crop yield and quality as well as for regulating nitrogen level imbalances due to increased fertilizer use, for pesticide dosage, et cetera.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing biochar or other soil amendment application rates, the literature discusses topsoil spreading and sometimes mechanical blending down as far as 30 centimeters with surface disruption; but there are no references exist in the art to provide multiple targeted releases through injection at and below the root zone with minimal surface disruption.

US patent U.S. Pat. No. 5,207,168A issued to Comer discloses a method and apparatus for treating turf to reduce the general soil density in which turfgrasses grow and thus promote turf growth and turf drainage which includes injecting through the turf into the soil a pattern of jets of generally incompressible liquid at a jet pressure and jet spacing to provide a lateral dispersion of the liquid within the soil such that the liquid dispersion from adjacent jets co-act with one another to lift and fracture the soil. A plurality of small diameter nozzles are mounted on a movable frame generally transverse to the direction of travel of the frame. A pressurized fluid source is mounted on the frame and connected through a control device to the nozzles. The control device controls the flow of liquid from the pressure source to the nozzles to produce periodic, relatively small cross-sectional, slugs, or jets, of liquid from the nozzles through the turf into the soil. The pressure on each slug of liquid is such that the liquid penetrates through the turf into the soil and also disperses generally laterally within the soil. The spacing of the nozzles and the speed of travel of the frame are such the lateral dispersion of each slug of liquid co-acts with adjacent slugs to lift and fracture the soil, thereby reducing the compaction, or general density, of the soil and promoting turf growth and drainage.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each time defines an internal passage with outlet apertures. A piston rod connected to each time and a cylinder has a piston that forces air into a reservoir and via a line into the passage. The mechanism is timed such that a pulse of air is injected into the ground through outlet apertures at the position of maximum penetration of the ground by each time. Instead of air, a liquid or other gaseous substance may be injected into the ground where it is penetrated by each time. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below horizon A and or below 30 cm from the surface.

The present specification further recognizes that there is a need for blending soil amendment materials below the root zone and/or at desired targeted zones along the sub-surface root zone that does not currently exist. There is a further need for an efficient and cost-effective hollow shaft injection drilling array to enable sequential dispensing of a plurality of constituents at targeted depths.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

A hollow shaft injection drilling array to enable sequential dispensing of a plurality of constituents at targeted depths is provided substantially, as shown in and/or described in connection with at least one of the figures, as set forth more completely in the claims.

An aspect of the present disclosure relates to a hollow shaft injection drilling array to enable sequential dispensing of a plurality of constituents at targeted depths. The hollow shaft injection drilling array includes an artificial intelligence (AI) robot; a lens; a computer; a programmable logic controller (PLC); one or more encoders; one or more limit switches; a sensor; a plurality of hollow shaft drill bits; a plurality of guide rail(s); a plurality of matching platforms comprising elastomers, and granite; and a plurality of lead screws. The elastomers, granite, and lead screws enable sequential dispensing of the constituents within a plurality of different targeted depths controlled via the AI robot, the lens, the computer, the PLC, the encoder, and the limit switch, and the sensor. The limit switches and the encoders enable the hollow shaft injection drilling array to sequence the constituents to be injected at one or more specific depths.

In an aspect, the hollow shaft injection drilling array enables capturing of targeted volumes of the constituents thereby creating one or more of: a mono or a poly constituent horizon through a plurality of instructions from the AI robot, the lens, the computer, the PLC, the encoder, the limit switch, and the sensor.

In an aspect, the hollow shaft injection drilling array enables the hollow shaft drill bits to be refilled with the constituents at specific depths to achieve volume efficacy through instructions from the AI robot, the lens, the computer, the PLC, the encoder, the limit switch, and the sensor.

In an aspect, the hollow shaft injection drilling array enables subsurface injection of living organisms, other micro-organisms, bacteria, fungi, gases, liquid, damp, slurry, steam, wettable, and/or dry constituents through a plurality of hollow shaft injection drill bits.

In an aspect, the hollow shaft injection drilling array is enabled by thermal or non-thermal imaging performed by a camera of the AI robot and the lens to sequence the constituents to be injected at the specific depths.

In an aspect, the hollow shaft injection drilling array enables time interval injection by the encoder counting a slower turn rate and adding a plurality of specific constituents to determine the volume to change soil porosity.

In an aspect, the hollow shaft injection drilling array injects horizontally and or horizontally during the descending and or the ascending drilling process.

In an aspect, the hollow shaft injection drilling array includes a plurality of hollow shaft injection drilling arrays members acting independently or in concert with other hollow shaft injection drilling arrays members during the ascending and/or descending drilling process.

In an aspect, the lead screws enable one or more hollow shaft injection drill bits or a plurality of injection drill bits to act independently via instructions from the AI robot, the lens, the computer, and the PLC.

In an aspect, the hollow shaft injection drilling array enables the hollow shaft injection drill bits to individually stop drilling, or to stop at an interval of time.

In an aspect, the hollow shaft injection drilling array enables the hollow shaft injection drill bits with a plurality of segmented platforms and the lead screws to individually stop drilling or not drill at a GPS coordinate, or to stop at a specific depth.

In an aspect, the hollow shaft injection drilling array enables the hollow shaft injection drill bits to individually stop drilling upon slowed revolutions of the encoder detection indicating specified resistance.

In an aspect, the hollow shaft injection drilling array enables via the AI robot, the lens, the computer, the PLC, Lidar database, and/or other subsurface map overlay to detect specified impediments and or prescribe subsurface actions.

In an aspect, the hollow shaft injection drilling array enables via the encoder data inference for the AI robot, the lens, the computer, the PLC, and the ternary database of soil type porosity and tightness dynamically interpreting revolution speed resistance to the hollow shaft injection drill bits.

In an aspect, the hollow shaft injection drilling array enables the database of soil type and/or existing core sample data to dynamically interact with the hollow shaft injection drill bit motor to protect it from damage.

In an aspect, the hollow shaft injection drilling array enables dynamic sample recording of information to the AI robot, the lens, the computer, the PLC, the encoder, the limit switch, and/or the sensor or a satellite communications dish of a specific depth at the GPS location including date stamp and record of injections.

In an aspect, the hollow shaft injection drilling array enables dynamic recording of information to the AI robot, the lens, the computer, the PLC, the encoder, the limit switch, and/or one or more types of sensors with or without a satellite communications dish to achieve a plan of specific depth and volume dispensed of specific constituent at the GPS location including date stamp and record of injections.

In an aspect, the hollow shaft injection drilling array enables subsurface instrument and/or sensor introduction and recordation through the hollow shaft injection drill bits, one or more apertures of the hollow shaft injection drill bits, and/or a plurality of perforations to take specific readings.

In an aspect, the hollow shaft injection drilling array enables electrical current for a plurality of devices through a plurality of hollow shaft channels (space between outside dimensions and interior dimensions of the shaft, tubes, and conduits), an example is a space between outer dimension wall of a conduit tube and inner dimension wall of the hollow shaft injection drill bit.

In an aspect, the hollow shaft injection drilling array enables the insertion of a measurement, scanning, and or photographic or ultrasound device, through the AI Robot with a camera device that is capable of performing through a perforation and/or the apertures.

In an aspect, the hollow shaft injection drill bits include the matching platforms the lead screws, and the guide rail(s) configured within the hollow shaft injection drilling array to independently be controlled by the A robot, the lens, the computer, the PLC, the Lidar database and/or other subsurface map overlay to prescribe subsurface actions for maximum or minimum depth based on constituent prescription.

In an aspect, the hollow shaft injection drilling array enables one or many exterior surfaces of a hollow shaft drill bit to be a carrier of the constituents for sub-surface kinetic release.

In an aspect, the hollow shaft injection drilling array enables the one or more exterior surfaces or perforation(s) cavity(ies) of the hollow shaft drill bit to be coated and/or filled with adhesives and or then with abrasives to mitigate smearing by kinetic force and/or by ejection.

In an aspect, the hollow shaft injection drilling array is limited to the depth at a specific GPS location.

In an aspect, the hollow shaft injection drilling array is turned off at specific GPS locations.

In an aspect, the individual hollow shaft injection drilling arrays members features such as blending wings are turned off at specific GPS locations or mechanically if they share a platform and lead screw.

In an aspect, the matching platforms and/or the lead screws generate vibration and torque that are dampened by granite or other adsorbing rock and or aggregate formed material and/or by layered elastomers, and/or friction springs and/or by other friction springs, and a disc coupling between the matching platform and gearbox(es) where each drill within the array comprising and/or is associated with a gearbox interface.

In an aspect, the vibration and torque generated upon the guide rails are dampened by friction springs.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 15A illustrates a view of an exemplary communications platform of an injection drilling trailer with components seen in FIG. 15B and FIG. 15C, in accordance with at least one embodiment.

FIG. 15B illustrates a view of an exemplary satellite communications dish, in accordance with at least one embodiment.

FIG. 15C illustrates a view of an exemplary close-up of components within a circle of FIGS. 15A and 1505A, in accordance with at least one embodiment.

DETAILED DESCRIPTION

Figure 1A:
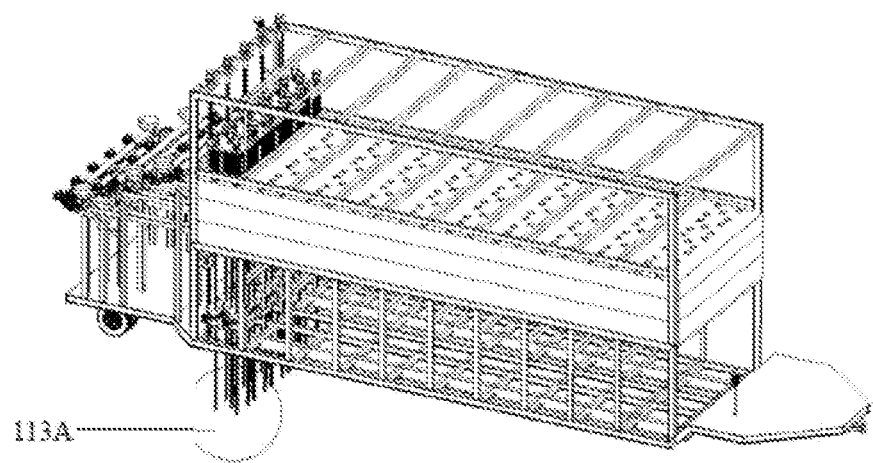
FIG. 1A illustrates a view of an exemplary constituent injection drilling array trailer with a call-out close-up of 113A an injection drilling array, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches an Array of Injection Drilling Bits for ejecting dispensed Constituent material by sequence through controllable singular or as a plurality of hollow injection shaft drill bits through vertical and horizontal apertures and perforation openings enabling subsurface injection of Constituents and or populated Tube with Constituents. An injection drilling auger array has a dampened and or modular platform including a plurality of coordinates intersecting each other at a position to form an effective grid pattern or horizon. The perforations and apertures of the injection drilling auger arrays are dimensioned to receive constituents and release them in accordance with programmed formulas and sensor data, GPS position, and horizon depths.

According to a first embodiment of the present invention, it enables sequential dispensing of constituents at targeted depths.

According to a second embodiment of the present invention, it enables capturing of targeted volumes of constituents thereby creating mono or poly constituent horizons.

According to a third embodiment of the present apparatus, it enables the hollow shaft of drill bits to be refilled with Constituents at specific depths to achieve volume efficacy.

According to a fourth embodiment of the present invention, it enables subsurface injection of living organisms, other micro-organisms, bacteria, fungi, gases, liquid, damp, slurry, steam, wettable, and or dry constituents through one or a plurality of hollow shaft injection drill bits.

According to a fifth embodiment of the present invention, it enables a sequence of constituents to be injected.

According to a sixth embodiment of the present invention, it enables time interval injection of any Constituent to determine volume.

According to a seventh embodiment of the present invention, it enables injection during the descending drilling process.

According to an eighth embodiment of the present invention, it enables injection during the ascending drilling process.

According to the ninth embodiment of the present invention, it enables a single injection drill bit or a plurality of injection drill bits to act independently.

According to the tenth embodiment of the present invention, it enables independent hollow shaft drill bits to individually stop drilling or to stop at an interval of time, or at a specific depth.

According to the eleventh embodiment of the present invention, it enables independent hollow shaft drill bits to individually stop drilling upon sensor detection of specified impediments.

According to the twelfth embodiment of the present invention, it enables independent hollow shaft drill bits to individually stop drilling upon sensor detection of specified resistance.

According to the thirteenth embodiment of the present invention, it enables via artificial intelligence, Computer and or PLC database Lidar and or other subsurface map overlay subsurface actions.

According to the fourteenth embodiment of the present invention, it enables via artificial intelligence, Computer, and or PLC database of soil type porosity and tightness dynamically interpreting resistance to the hollow shaft injection drill bit.

According to the fifteenth embodiment of the present invention, it enables strata by strata data from core samples with GPS coordinates to enable proper RPM range for hollow shaft injection drill bit motors to protect the motor from damage.

According to the sixteenth embodiment of the present invention, it enables a database of soil types to dynamically interact with shaft injection drill bit motors to protect the motor from damage.

According to the seventeenth embodiment of the present invention, it enables dynamic sample recording of information to PLC and or Computer local or Cloud of specific depth at GPS location including date stamp.

According to the eighteenth embodiment of the present invention, it enables dynamic recording of information to PLC and or Computer local or Cloud of specific depth and volume dispensed Constituent at GPS location including date stamp.

According to the nineteenth embodiment of the present invention, it enables subsurface instrument and or sensor introduction and recordation through the hollow shaft of the drill bit and its apertures and or perforations to take specific readings.

According to the twentieth embodiment of the present invention, it enables electrical current for devices through hollow shaft channels.

According to the twenty-first embodiment of the present invention, it enables the dynamic electromagnetic charging of devices within the structure of the drill bit assembly by being made of a conductive metal.

According to the twenty-second embodiment of the present invention, it enables the insertion of measurement and or scanning or photographic device capable of performance through a perforation and or aperture.

According to the twenty-third embodiment of the present invention, it enables the placement of the hollow shaft drill bit into the ground for a purpose and at a later date remove it.

According to the twenty-fourth embodiment of the present invention, it enables arrays and or individual hollow shaft drill bits within the array to independently be controlled by the computer, AI robot, and or PLC for maximum or minimum depth based on constituent prescription.

According to the twenty-fifth embodiment of the present invention, it enables any exterior surface of a hollow shaft drill bit to be a carrier of Constituents for sub-surface kinetic release.

According to the twenty-sixth embodiment of the present invention, it enables any exterior surface of a hollow shaft drill bit to be coated with adhesives and then with abrasives to mitigate smearing.

According to the twenty-seventh embodiment of the present invention, it enables any perforation(s) cavity of a hollow shaft drill bit to be coated with adhesives and then with abrasives to mitigate smearing.

According to the twenty-eighth embodiment of the present invention, it enables enable any perforation(s) cavity of a hollow shaft drill bit to be filled with a constituent to be ejected at specific depths.

Definitions

"Abrasives": means any Constituent capable of inhibiting smearing. By way of example but not limited to Abrasives include walnut shells, pecan shells, and corn stover.

"Actuated": A device that causes a machine or other device to operate open or close and dispense a volume of material by way of example but not limited to a gate or valve opening or closing.

"Aerogel": an elastomer made of materials such as any combination of monomers or polymers filled with gas and vacated and subsequently vacated spaces that have a very low density compared to other elastomeric materials.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Auger Array": A multiple hollow shaft drilling injection drill bits or feeder augers in multiple configurations; sharing the same damping platform or a segmented damping platform with multiple lead screws.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides by way of example but not limitation organophosphates, carbamates, or pyrethroids) and sometimes an additive (usually oil, sugar or water) to increase attractiveness. The toxicant part of a bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Cable Guide": A wire that can be contracted or let down via a motor whose winding guides and determines the length of the elastomer tube jacket.

"Chemical": Means a compound or substance that has been purified or prepared, especially artificially for purposes of sub-surface amendment, by way of example but not a limitation; fertilizers, sorption materials like zeolites, fungicides, herbicides, and insecticides. A chemical can mean any basic substance which is used in or produced by a reaction involving changes to atoms or molecules by way of example but not limitation liquids, solids, or gases.

"Cloud" or "Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid panicles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, Examples of colloids include by way of examples but are not limited to the following fog, smoke, and foam.

"Constituent(s)": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologic for unwanted pests. Solid Constituents can be any polygonal shape, by way of example but are not limitation fines, granules, pellets, briquettes, blocks, or larger fragments that can fit inside and be ejected from a hollow shaft drill bit. Colloids regardless of phase state are considered as constituents. Constituents can contain doses of other constituents. Constituents also include sorption or sorbent materials.

"Copolymer": means Polymer constructed of two or more monomers.

"Copper Bands": The windings are flat copper strips to withstand the Lorentz force of the magnetic field. Electricity in the wire passes into the slip ring to make it into a magnet. A copper band includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints-one fixed to each shaft-which are connected by a spindle, or third shaft. A flange within the drawings below or at the top of a gearbox is disc couplings.

"Corrugated": A design for material, surface, or structure) shaped into alternate ridges and grooves, that enable strength, with expansion or retraction.

"Damping" or "Damping Platform or Array Damping Platform": A decrease in the amplitude of an oscillation as a result of energy being drained from the system to overcome frictional or other resistive forces. For highly demanding drilling equipment, the stress on the dampers is particularly great, but this does not produce a problem for friction springs. The increased compressed air requirements and the high damping are ideal for such applications. Furthermore, the increased reliability of friction springs by virtue of their design is a decisive advantage over other damping systems. In this case, the friction spring does not only provide for energy absorption but also compensates for clearances that may occur between the individual components during continuous operation. Can refer to the gearbox, motor, slip ring, and lead screw platform, where the substrate is materials by way of example but not limitation granite or plastics that have tensile strength for mounting but have properties to damp vibration and or torque. Can also refer to sandwiched layered substrates that mitigate vibration such as by way of example but not limited to granite and elastomers.

"Density": Bulk density, also called apparent density or volumetric density, is a property of powders, granules, and other "divided" solids, especially used in reference to mineral components (soil, gravel), chemical substances.

"Drill Bit" Any device capable of making a subsurface hole when connected to a power source with perforation holes or apertures, which may be any polygon with equal or unequal side lengths, and is manufactured from alloys, steel, titanium, manganese, or other materials. The drill bit may contain industrial diamonds for sub-surface injection cavity creation.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Elastomer": High molar mass material that when deformed at room temperature reverts quickly to nearly original size and form when the load causing the deformation has been removed (ISO 1382:1996). Within this patent, the word Elastomer can mean any Elastomeric material by itself or combined with concrete, aggregate solids, or carbon fiber. Elastomeric materials when referred to within this patent are interchangeable. Some materials that are Elastomer, but not limited to the following examples are Aerogel, Graphene Aerogel, Aerographer, Monomer, Polymers, Homopolymers, Copolymers, Rubber, Natural Rubber, Silicone and Silicone Gel, Synthetic Rubber, Vulcanization, cross-linking, Thermoplastic elastomer, and Rubber types.

"Elastomer Tube Jacket" or "Feeder Auger Flexible Flight Conduit Outer Tubes"; A expandable or retractable corrugated elastomer jacket covering the feeder auger. Jacket motors are AI Robotically, Computer, PLC, and or Sensor controlled. Jacket Tubes be made of UHMWPE or polypropylene construction. The extremely smooth interior surface of UHMWPE adds additional protection from cross-contamination. For embodiments requiring even greater resistance to material contamination, and long-term wear resistance, NBE Type 304 stainless steel Conduit outer tubes, and NBE carbon steel Conduit outer tubes assure performance, with demanding process constituents, and duty cycles, or both.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the plunger panel that holds plunger panels in shut-stacked, deployed, or in the right position and attached to the motor shaft.

"Feeder Auger" or "Feeder Auger Flexible Conveyor Wire Screw": Examples of feeder augers that feed the materials to the drilling auger or its drilling inner tube, include feeder flexible conveyor flight screws, flexible conveyor flight beveled round wire screws, flexible conveyor flight beveled square wire screws, flexible conveyor flight beveled wire screws, and flexible conveyor flight flat wire screws. All feeder auger flexible flight conveyor screws have an external feeder auger conduit tube.

"Fastener Ring": A ring feature as part of the plunger panel that holds plunger panels in shut-stacked, deployed, or in the right position and attached to the motor shaft.

"Feeder Auger Conduit Tubes": A component of a feeder auger, flexible conveyor flight beveled round wire screw, flexible conveyor flight beveled square wire screws, flexible conveyor flight beveled wire screws, and flexible conveyor flight flat wire screws, which are used for and made of; "Polypropylene": For applications requiring high-volume conveying, or conveying of larger materials, Polypropylene outer tubes provide large-diameter tube construction to accommodate the application-appropriate flexible conveyor screw outside diameter and flight design. Polypropylene tube is non-bending and is typically used in runs of up to 30 feet. "UHMWPE": For applications requiring exceptional operating durability and performance, flexible screw conveyor outer tubes are constructed of ultra-high molecular weight polyethylene (UHMWPE). These UHMWPE outer tubes have the highest impact strength and tensile strength of any thermoplastic outer tube; non-corrosive, and temperature resistant. UHMWPE outer tubes can bend to a radius as tight as 6 feet; enabling the conveying tube to run around obstacles. UHMWPE outer tubes are used typically in lengths up to 40 feet. "Stainless Steel": For applications requiring excellent corrosion resistance and cross-contamination resistance, Type 304 stainless steel outer tubes are nearly impervious to most conveyable materials. Stainless steel outer tubes also have an inherent rigidity that enables longer runs between supports than UHMWPE. "Carbon Steel": For applications requiring very high tube strength, beyond even that of UHMWPE; but where the exceptional corrosion resistance and regulatory compliance of stainless-steel tube are not required a high-performance alternative.

"Flange": A projecting flat rim, collar, or rib on an object, serving to strengthen or attach. A flange is a rib or rim for strength, for guiding, or for attachment to another object. Where a flange appears in a drawing associated with a hollow shaft injection drill bit can also mean a gear box coupling and or gearbox disc coupling.

"Flexible Conveyor Flight Beveled Round Wire Screws": For applications where material flow is typically semi-free flowing to sluggish flowing, and material characteristics are highly abrasive, granular, flake, pellet, or irregular shape; the round bar wire screw provides excellent conveying of materials by way of example but not limitation: fine granules, zeolites, small bean-like pellets, and polymer regrind.

"Flexible Conveyor Flight Beveled Square Wire Screws": For applications where the material flow can be free-flowing, semi-free flowing, or sluggish, and material characteristics are highly abrasive, with high bulk density; the square bar wire screw provides highly efficient conveying of materials by way of example but not limitation: sand, heavy density powders, and large biochar.

"Flexible Conveyor Flight Beveled Wire Screws": For applications where material flow is typically semi-free flowing to sluggish flowing, and material characteristics are sticky, with tendencies to pack, smear, cake, or crumble; the beveled wire screw may have a wide-face design for conveying of materials by way of example but not limitation: iron oxide, zinc oxide, powders, and carbon black.

"Flexible Conveyor Flight Flat Wire Screws": For applications where material flow is typically free-flowing to semi-free-flowing, and material characteristics are lightweight, highly aerated, powdered, or fluidizing; the flat wire screw may have a wide-face design for conveying of materials by way of example but not limitation: calcium carbonate, fumed silica, and biochar fines.

"Flight Conduit Outer Tubes": Within this space a separate channel such as a smaller diameter or perimeter tube incorporated into the side wall or an appendix to a conduit tube.

"Friction Spring": Friction springs consist of precisely manufactured outer and inner rings which touch each other on their tapered faces. Friction springs are indispensable safety components in all fields of technology where suddenly occurring forces have to be taken up and kinetic energy absorbed, or where springs are required with relatively compact dimensions while also being able to sustain high forces. Expert friction springs are needed when it comes to the deceleration of moving masses in a quick, safe, and precise manner.

"Fuel Cell": A cell producing an electric current directly from a chemical reaction. Or may also refer to a rechargeable battery.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"GPS" "Global Positioning Satellite": An accurate worldwide navigational and surveying facility based on the reception of signals from an array of orbiting satellites.

"Ground Level": If something is at ground level, it is at the same level as the soil, rock, or water surface, as opposed to being higher up or below the surface.

"Hollow Shaft Channel": Any injection auger and or drill bit space between the walls, space may be cylindrical or any polygonal shape. Within this space a separate channel such as a smaller diameter or perimeter tube incorporated into the side wall or an appendix to a Flight Conduit Outer Tubes.

"Hollow Shaft of Injection Drilling Array": Multiple units of hollow shaft injection drilling bit. A helical and or corkscrew has multiple parts: collar, bottom aperture, window aperture, spillway, perforations, wings, screw, spurs, cutting edges, twist, and shank. Expansive auger bits have adjustable blades with cutting edges and spurs that can be extended radially to cut large holes.

"Hollow Shaft of Injection Drilling Auger Array Member": A single of hollow shaft injection drilling bit. A helical and or corkscrew has multiple parts: collar, bottom aperture, window aperture, spillway, perforations, wings, screw, spurs, cutting edges, twist, and shank. Expansive auger bits have adjustable blades with cutting edges and spurs that can be extended radially to cut large holes.

"Hollow Shaft": Any injection auger and or drill bit space between the walls, space may be cylindrical or any polygonal shape.

"Hollow Shaft of Injection Drilling Auger": A corkscrew and has multiple parts: collar, bottom aperture, window aperture, spillway, perforations, wings, screw, spurs, cutting edges, twist, shank, and in some cases a tang. Expansive auger bits have adjustable blades with cutting edges and spurs that can be extended radially to cut large holes.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Homopolymer": means Polymer constructed of only one kind of monomer.

"Hopper": A container for a bulk material by way of example but not limited to injectable constituents, typically one that tapers downward and can discharge its contents at the bottom or a side panel.

"Injection Drill Bit": Any hollow shaft device of any polygonal width or diameter that is capable of penetration of ice, soil, rock, and or mineral. It can be made of by means of illustration and is not limited to materials carbon steel, aramids, alloys, titanium, and tungsten.

"Injection Drilling Bit": May be a bayonet, flat, impregnated head, screw, auger, fish tail, or any shape that can penetrate a sub-surface.

"Injection Drill Bit Auger Extension": A connection segment for devices used in sub-surface operations. Some examples are Windows, Apertures, and Wings.

"Injection Drill Bit Screw": A tapered shape drilling bit or cylindrical shape with threads like a screw, with or without perforations.

"Inoculants": A constituent (a virus or toxin or immune serum) that is introduced into the subsurface of soil to produce or increase immunity to an undesirable living organism.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A limit switch can refer to a plurality.

"Living Organisms": An individual form of life, by way of example but not limitation a bacterium, protist, fungus, plant, or animal, composed of a single cell or a complex of cells in which organelles or organs work together to carry out the various processes of life, including in some circumstances virus.

"Magnetic Metals": Include ferromagnetic metals by way of example but are not limited to iron, nickel, cobalt, gadolinium, dysprosium, and alloys by way of example but not limited to steel that also contains specific ferromagnetic metals such as iron or nickel.

"Minerals": A solid chemical compound with fairly well-defined chemical composition and a specific crystal structure that occurs naturally in pure form.

"Monomer": means Low molar mass molecules which can react with the same or a different kind of monomers, thus composing a polymer.

"Natural Rubber": means Cis-1,4-polyisoprene obtained from the latex of the rubber tree, most frequently from Hevea *Brasiliensis* plants.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Platform": A ledge or shelf with damping.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer or remote Cloud computer.

"Polygon": a plane figure with at least three straight sides and angles, and typically five or more.

"Polymer": means Macromolecules constructed by the repetition of primary monomer units in such a way that the properties of the material do not change significantly due to the insertion or removal of some primary units.

"Porosity Soil" or "Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Router": is a network hardware device equipped with a cellular hot spot that allows making communication in between the internet and all devices which are linked to the internet in your house and office. The router has responsible to receives, analyze, and forwarding the all-data packets from the modem and transferring it to the destination point.

"Rubber": means Cross-linked, vulcanized elastomer free of solvent which contracts to its 1.5-fold the original length in one minute after the tension which has stretched the rubber to double length at room temperature has been released.

"Rubber type": means a group of rubber elastomers having the same kind of characteristics and enabling the same applications for products made of that group of elastomers.

"Rubber quality": means a vulcanized mixture of rubber satisfying a certain set of quality requirements.

"Satellite Dish": a bowl-shaped antenna with which signals are transmitted to or received from a communications satellite.

"Silicone" and "Silicone Gel": means a material that has shear characteristics of specially formulated silicone elastomers. These characteristics allow the energy absorption and return spring functions efficacy.

"Slip Ring" or "Slip Ring Bore Hole": a ring in a dynamo or electric motor which is attached to and rotates with the shaft, passing an electric current to a circuit via a fixed brush pressing against it. A Slip Ring with a hollow shaft creates a borehole for an injection drill bit shaft.

"Sorption" or "Sorbents" Are Constituents capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, by way of example but not limitation carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used and may be made in molecular clusters or molecular chains to obtain the desired quality, i.e., type of adsorption/absorption, and volume capacity in terms of the desired porosity. Examples of Sorption or Sorbents also include constituents by way of example but do not limited to Bio-Char and Zeolites.

"Steel Ring": Metal reinforcement in Elastomer Tube Jacket.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Synthetic Rubber": means Rubber that has been produced by polymerizing one or more monomers.

"Telescoping Corrugated Elastomer Steel Ring Jacket": AI Robotically. Computer, PLC, and or Sensor controlled corrugated version of Elastomer Tube Jacket.

"Thermoplastic Elastomer": Thermoplastic elastomers are in many respects a rubber-like material that need not be vulcanized. The rubbery character disappears at the processing temperature but returns when the material has reached the operating temperature.

"Vulcanization": means an irreversible process in which the rubber compound is transformed in a chemical reaction (e.g., cross-linking) into a three-dimensional network that preserves its elastic characteristics over a wide temperature range. The term vulcanization is connected with the use of Sulphur and its derivatives, whereas the term cross-linking is usually connected with Sulphur-free processes.

"Worm Screw" and "Worm Gear": Used to transmit motion and power when a high-ratio speed reduction is required. Worm screws and worm gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates a view of an exemplary constituent injection drilling array trailer with a call-out close-up of 113A an injection drilling array, in accordance with at least one embodiment. FIG. 1A depicts a call-out for a close-up of FIG. 1B of injection drilling screw with collar and bayonet claw 113A.

Figure 1B:
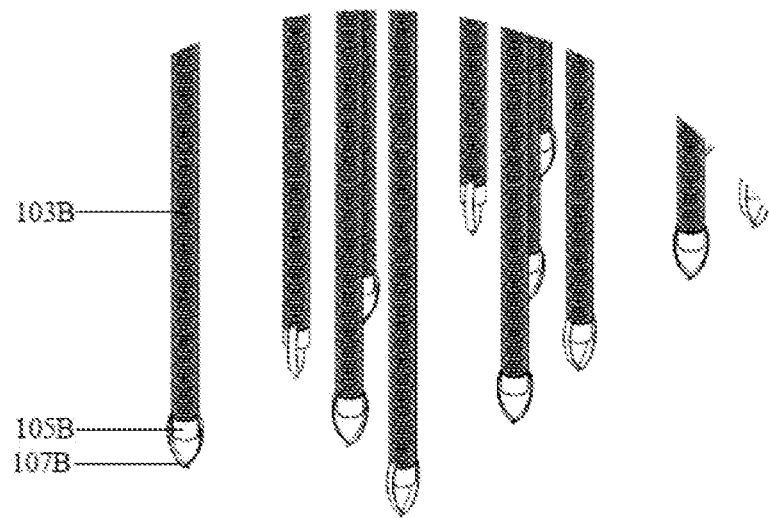
FIG. 1B illustrates a view of an exemplary close-up of FIG. 1A and call out 113A an injection drilling screw with bayonet loose soil injection drilling array, in accordance with at least one embodiment.

FIG. 1B illustrates a view of an exemplary close-up of FIG. 1A and call out 113A an injection drilling screw with bayonet loose soil injection drilling array, in accordance with at least one embodiment. FIG. 1B depicts an injection drilling screw 103B, a collar 105B, and a bayonet claw 107b.

Figure 2A:
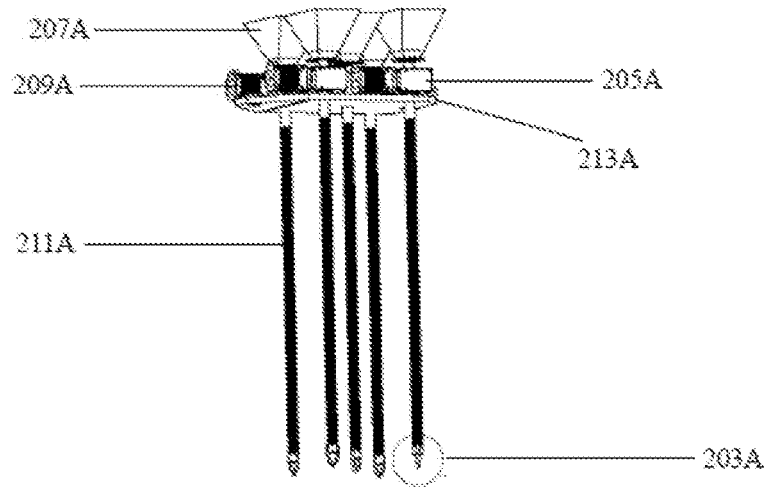
FIG. 2A illustrates a view of an exemplary injection drill bit assembly with a call-out close-up of 203A collar and bayonet, in accordance with at least one embodiment.

FIG. 2A illustrates a view of an exemplary injection drill bit assembly with a call-out close-up of 203A collar and bayonet, in accordance with at least one embodiment. FIG. 2A depicts call out for close-up seen in FIG. 2B of a side view of the bottom of a screw injection drill with hollow shaft 203A, a gearbox 205A, a hopper for feeder auger 207A, a motor 209A, and a screw injection drill with hollow shaft 211A.

Figure 2B:
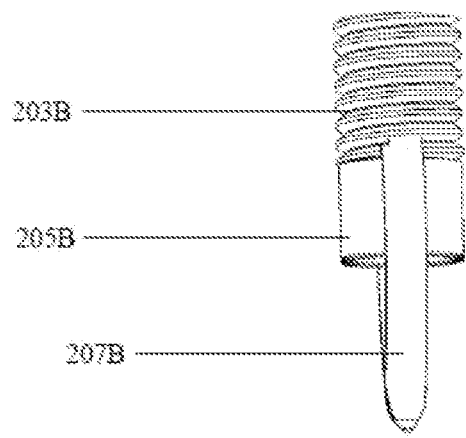
FIG. 2B illustrates a view of an exemplary close-up of FIGS. 2A and 203A show screw injection drill bit without perforations, collar, and bayonet, in accordance with at least one embodiment.

FIG. 2B illustrates a view of an exemplary close-up of FIGS. 2A and 203A show screw injection drill bit without perforations, collar, and bayonet, in accordance with at least one embodiment. FIG. 2B depicts an injection drilling screw with a hollow shaft and without perforations 203B, a protective collar for constituents within shaft 205B, and a bayonet claw drill bit 207B.

Figure 3:
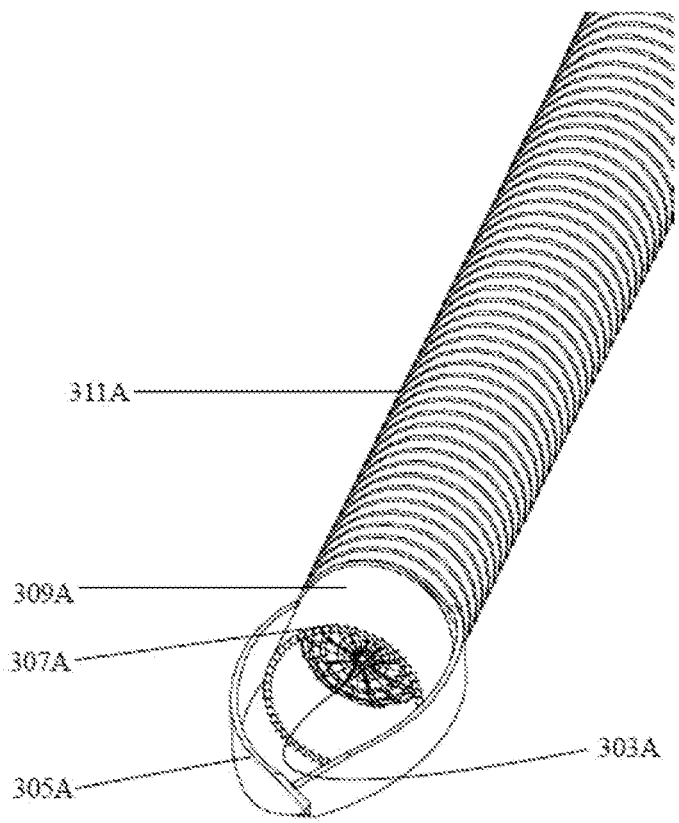
FIG. 3 illustrates a view of an exemplary tapered screw without horizontal perforations with a bottom view of the collar, collar teeth, bayonet, and spring-loaded bottom, in accordance with at least one embodiment.

FIG. 3 illustrates a view of an exemplary tapered screw without horizontal perforations with a bottom view of the collar, collar teeth, bayonet, and spring-loaded bottom, in accordance with at least one embodiment. FIG. 3 depicts an electromagnetic spring for hollow shaft 303, a bayonet claw 305, collar teeth 307, collar 309, and a tapered injection drill screw 311.

Figure 4A:
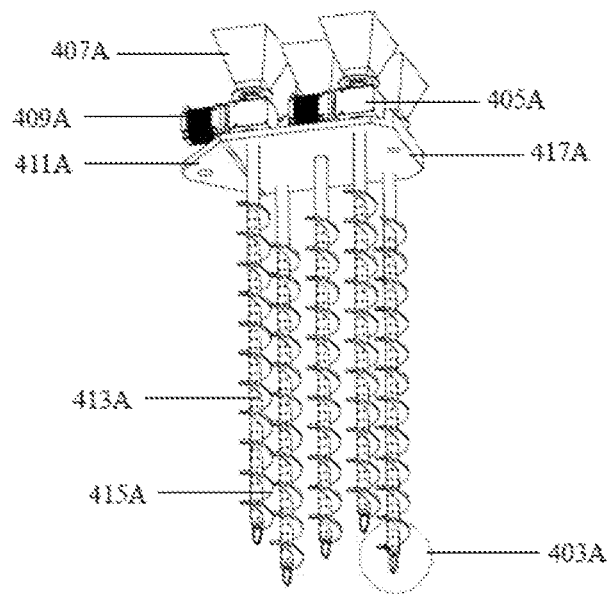
FIG. 4A illustrates a view of an exemplary injection drill bit assembly array with a call-out close-up of 203A collar and bayonet, in accordance with at least one embodiment.

FIG. 4A illustrates a view of an exemplary injection drill bit assembly array with a call-out close-up of 203A collar and bayonet, in accordance with at least one embodiment. FIG. 4A depicts a call-out of a close up as seen in FIG. 4*b* of a perforated injection drill bit with hollow shaft capped by bayonet claws with shaft perforations 403A, a gearbox 405A, hopper for feeder auger 407A, a motor 409A, array platform 411A, injection drill bit perforations 413A, and an auger screw 415A.

Figure 4B:
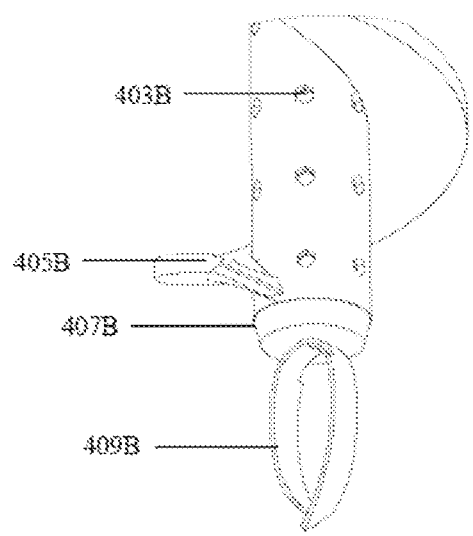
FIG. 4B illustrates a view of an exemplary close-up of FIGS. 4A and 403A show screw injection drill bit perforations, and bayonet, in accordance with at least one embodiment.

FIG. 4B illustrates a view of an exemplary close-up of FIGS. 4A and 403A show screw injection drill bit perforations, and bayonet, in accordance with at least one embodiment. FIG. 4B depicts perforations 403B, auger screw 405B, end cap 407B, bayonet claw 409B, and hollow shaft 411B.

Figure 5:
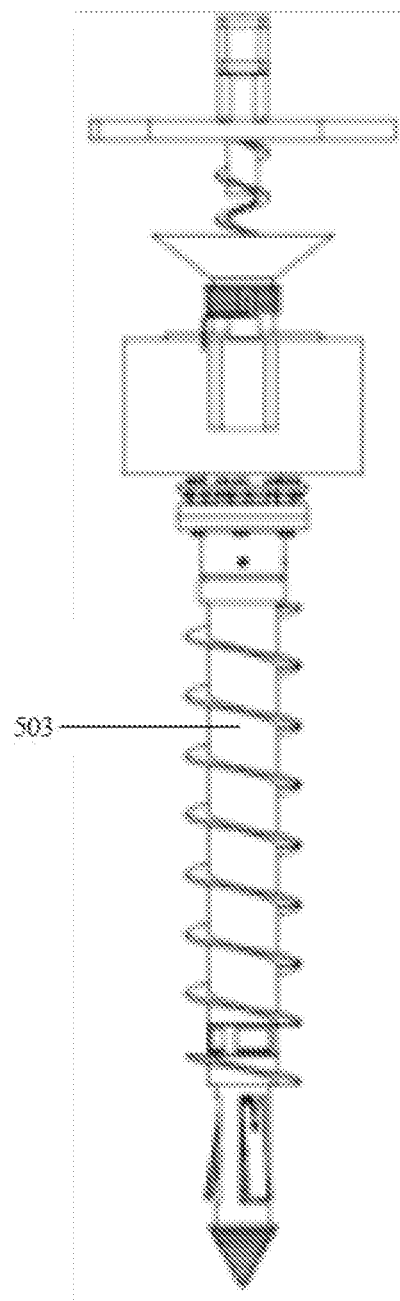
FIG. 5 illustrates a view of an exemplary one unit of a hollow shaft injection drill bit array, in accordance with at least one embodiment.

FIG. 5 illustrates a view of an exemplary one unit of a hollow shaft injection drill bit array, in accordance with at least one embodiment. FIG. 5 depicts a hollow shaft injection drill bit 503A.

Figure 6A:
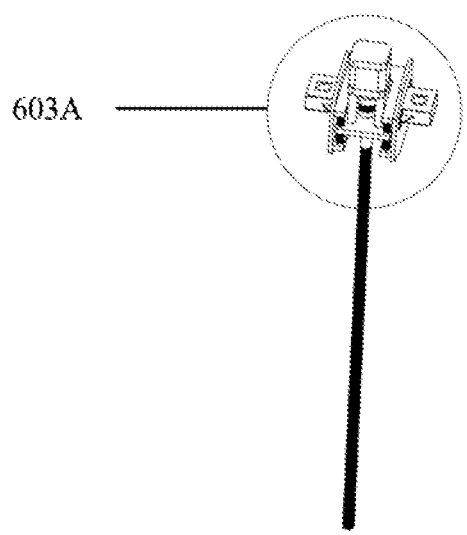
FIG. 6A illustrates a view of an exemplary lead screw damping platform, in accordance with at least one embodiment.

FIG. 6A illustrates a view of an exemplary lead screw damping platform, in accordance with at least one embodiment. FIG. 6A depicts a lead screw damping platform 603A.

Figure 6B:
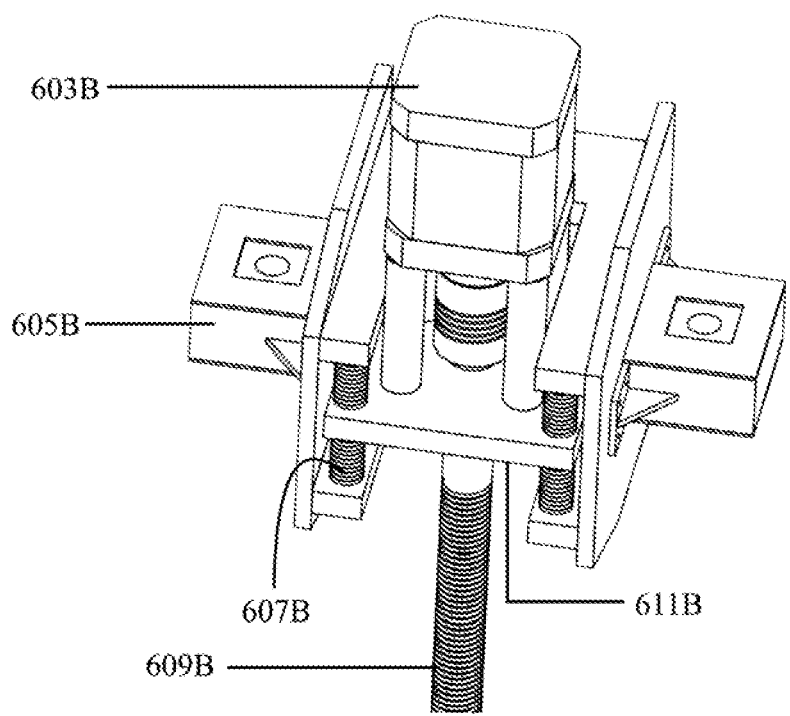
FIG. 6B illustrates a view of an exemplary close-up of a lead screw damping platform, in accordance with at least one embodiment.

FIG. 6B illustrates a view of an exemplary close-up of a lead screw damping platform, in accordance with at least one embodiment. FIG. 6B depicts a horizontal friction spring damping unit 603B, a lead screw motor 605B, friction spring 607B, a lead screw 609B, and a damping platform 611B.

Figure 7A:
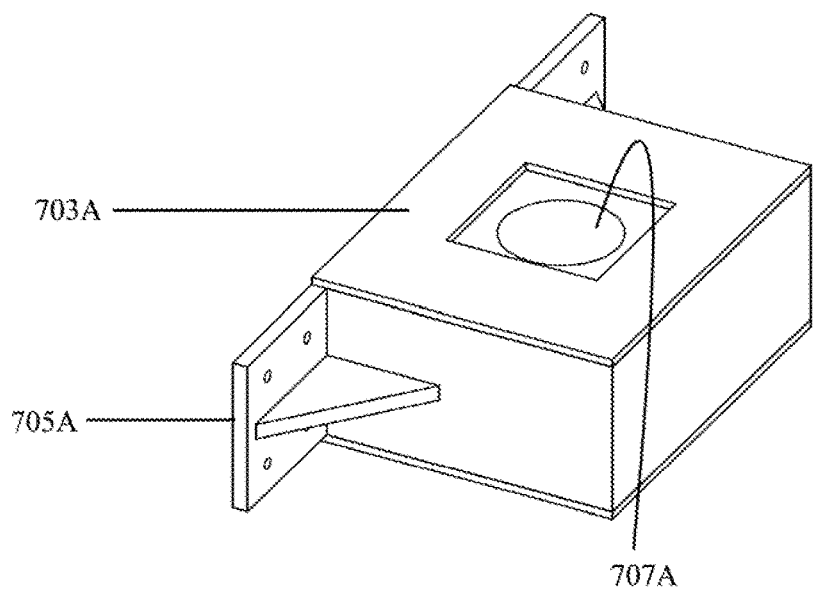
FIG. 7A illustrates a view of an exemplary close-up of a friction spring damping unit, in accordance with at least one embodiment.

FIG. 7A illustrates a view of an exemplary close-up of a friction spring damping unit, in accordance with at least one embodiment. FIG. 7A depicts a top plate 703A, a mounting bracket 705A, and a bottom housing plate 707A.

Figure 7B:
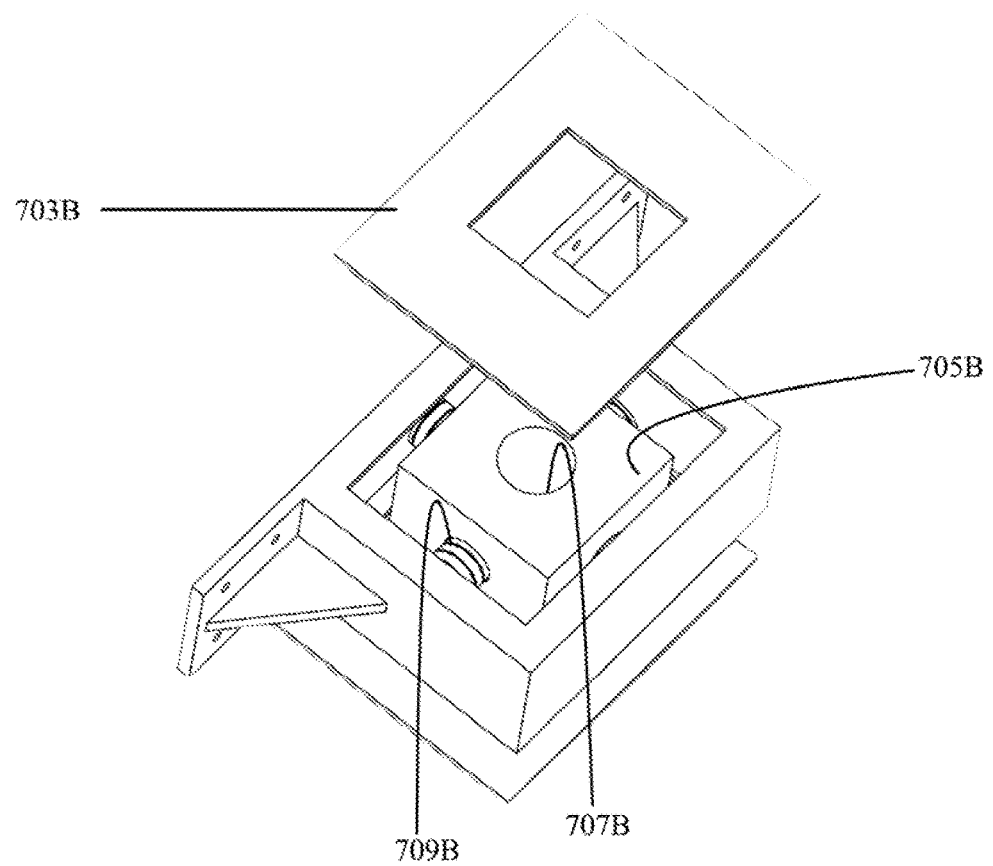
FIG. 7B illustrates a view of an exemplary close-up exploded view of a friction spring damping unit, in accordance with at least one embodiment.

FIG. 7B illustrates a view of an exemplary close-up exploded view of a friction spring damping unit, in accordance with at least one embodiment. FIG. 7B depicts a top plate 703B, a bearing block 705B, a bottom plate 707B, and a friction spring 709B.

Figure 8:
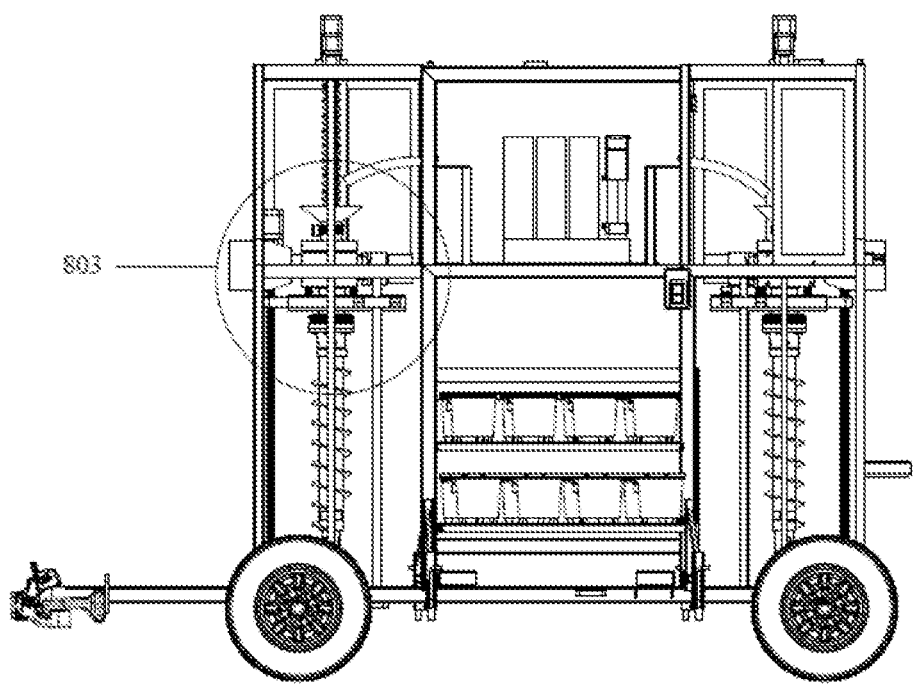
FIG. 8 illustrates a view of an exemplary injection drilling bit array with a damping platform, in accordance with at least one embodiment.

FIG. 8 illustrates a view of an exemplary injection drilling bit array with a damping platform, in accordance with at least one embodiment. FIG. 8 depicts an injection drilling bit array with damping platform 803.

Figure 9:
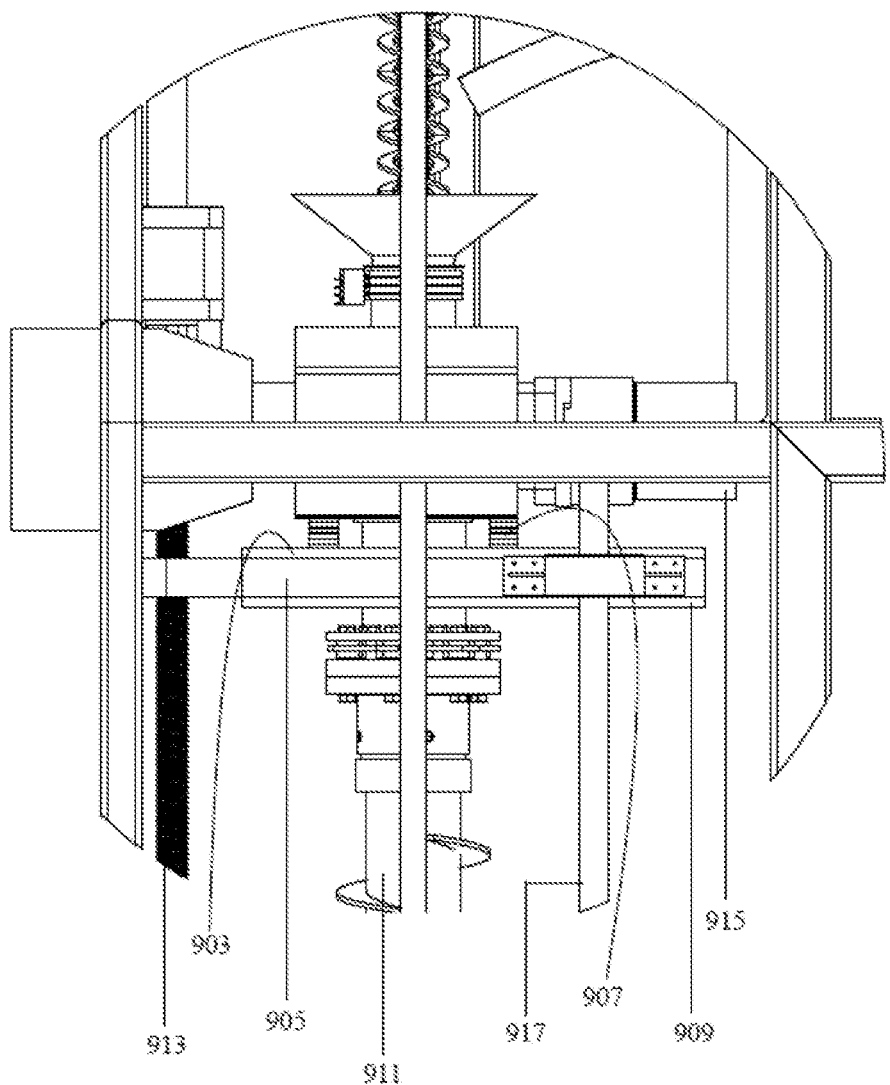
FIG. 9 illustrates a view of an exemplary close-up of an injection drill bit damping platform, in accordance with at least one embodiment.

FIG. 9 illustrates a view of an exemplary close-up of an injection drill bit damping platform, in accordance with at least one embodiment. FIG. 9 depicts an elastomer 903, a granite 905, a friction spring 907, elastomer 909, hollow shaft injection drill bit 911, lead screw 913, and hollow shaft injection drill bit motor 915.

Figure 10:
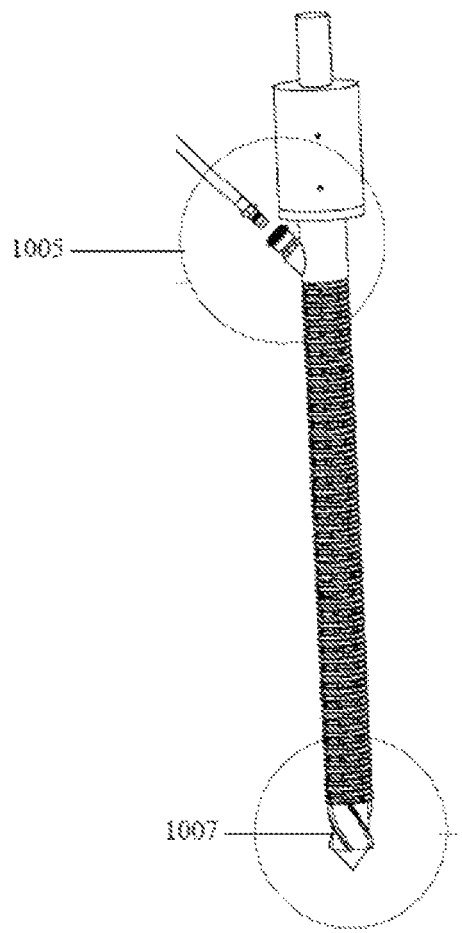
FIG. 10 illustrates a view of an exemplary hollow shaft injection drill bit with a robotically controlled quick connect disconnect feature, in accordance with at least one embodiment.

FIG. 10 illustrates a view of an exemplary hollow shaft injection drill bit with a robotically controlled quick connect disconnect feature, in accordance with at least one embodiment. FIG. 10 depicts a quick connect disconnect feature 1005, and a changeable drill bit tip 1007.

Figure 11:
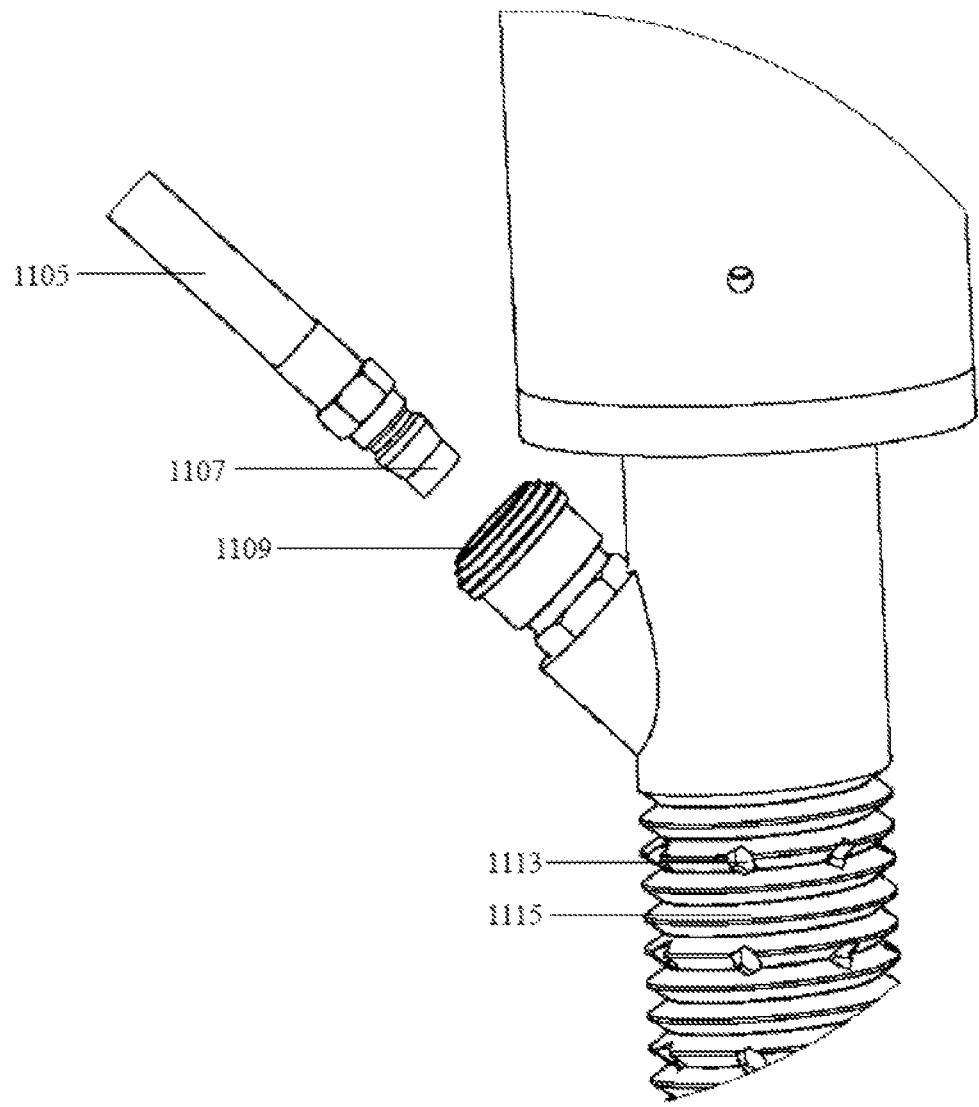
FIG. 11 illustrates a close-up view of an exemplary single drill injection unit robotic quick connect and perforated screw, in accordance with at least one embodiment.

FIG. 11 illustrates a close-up view of an exemplary single drill injection unit robotic quick connect and perforated screw, in accordance with at least one embodiment. FIG. 11 depicts pressure conduit 1105, a female quick release 1107, a male quick release 1109, a single drill injection bit screw thread 1113, and a single drill injection bit screw hexagon perforation 1115.

Figure 12:
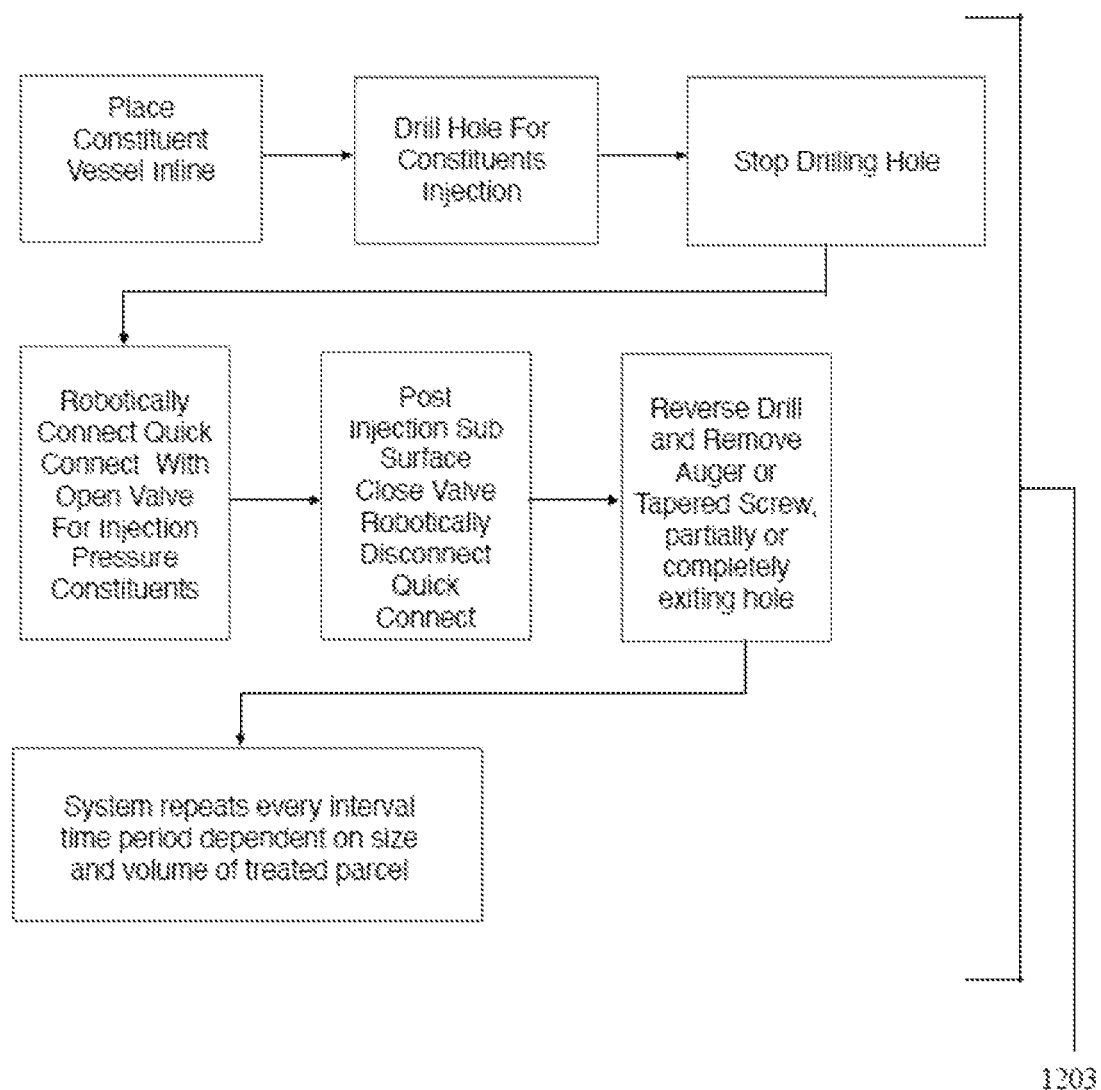
FIG. 12 illustrates a view of an exemplary quick connects process diagram, in accordance with at least one embodiment.

FIG. 12 illustrates a view of an exemplary quick connects process diagram, in accordance with at least one embodiment. FIG. 12 depicts a quick connect process diagram 1203.

Figure 13A:
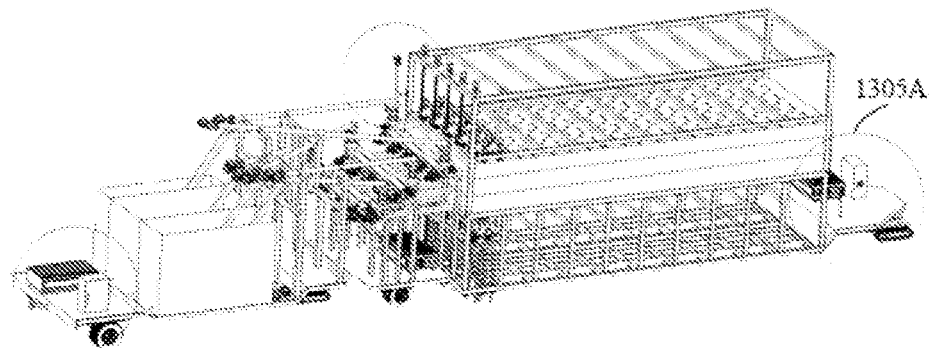
FIG. 13A illustrates a view of an exemplary PLC, in accordance with at least one embodiment.

FIG. 13A illustrates a view of an exemplary PLC, in accordance with at least one embodiment. FIG. 13A depicts a PLC 1305A.

Figure 13B:
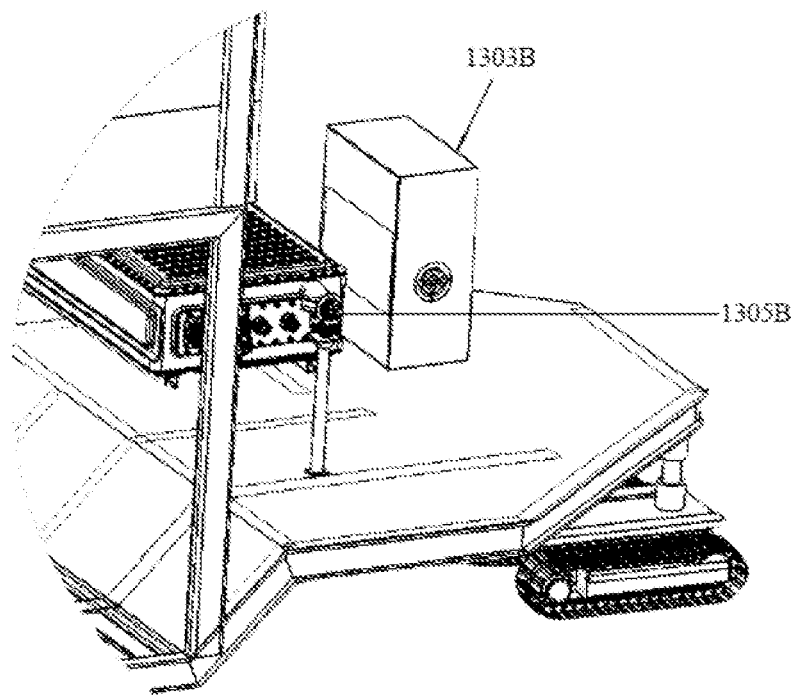
FIG. 13B illustrates a view of an exemplary is a close up of FIG. 13A 1305A, in accordance with at least one embodiment.

FIG. 13B illustrates a view of an exemplary is a close up of FIG. 13A 1305A, in accordance with at least one embodiment. FIG. 13B depicts PLC 1303B and AI robot 1305B.

Figure 14:
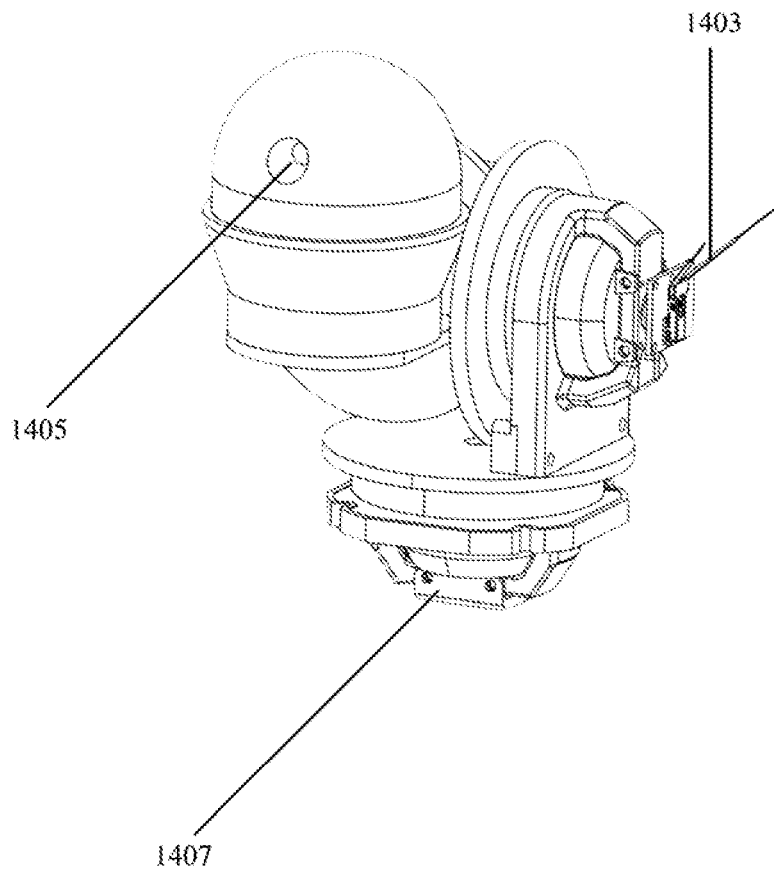
FIG. 14 illustrates a view of an exemplary AI robot, in accordance with at least one embodiment.

FIG. 14 illustrates a view of an exemplary AI robot, in accordance with at least one embodiment. FIG. 14 depicts a communications antenna 1403, a robot sensor eye and camera 1405, and a gimbal 1407.

FIG. 15A illustrates a view of an exemplary communications platform of an injection drilling trailer with components seen in FIG. 15B and FIG. 15C, in accordance with at least one embodiment. FIG. 15A depicts a satellite communications dish 1503A, and a communications platform 1505a containing components seen in FIG. 14C.

FIG. 15B illustrates a view of an exemplary satellite communications dish, in accordance with at least one embodiment. FIG. 15B depicts a satellite communications dish 1503B.

FIG. 15C illustrates a view of an exemplary close-up of components within the circle of FIGS. 15A and 1505A, in accordance with at least one embodiment. FIG. 15C, depicts a fuel cell 1503C, PLC 1505C, AI robot 1507C, a router 1509C, computer 1511C, and a GPS 1513C.

Figure 16A:
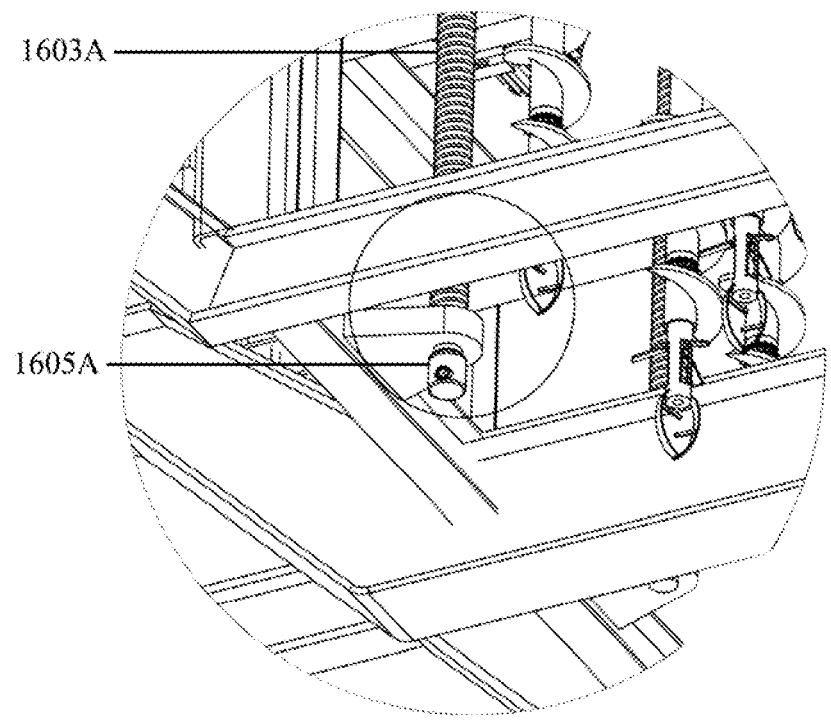
FIG. 16A illustrates a view of an exemplary encoder for lead screw revolution counting, in accordance with at least one embodiment.

FIG. 16A illustrates a view of an exemplary encoder for lead screw revolution counting, in accordance with at least one embodiment. FIG. 16A depicts a lead screw 1603A, and an encoder 1605A.

Figure 16B:
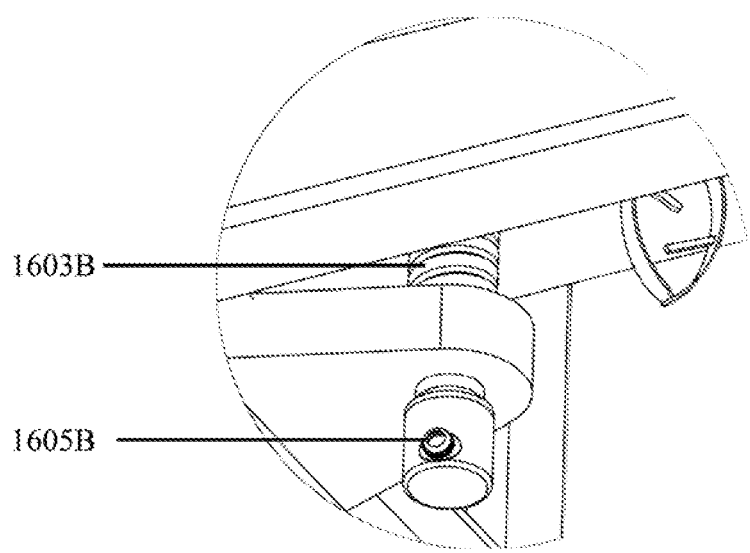
FIG. 16B is a view of an exemplary close-up view of FIG. 16A is an encoder for lead screw revolution counting, in accordance with at least one embodiment.

FIG. 16B is a view of an exemplary close-up view of FIG. 16A is an encoder for lead screw revolution counting, in accordance with at least one embodiment. FIG. 16B depicts a lead screw 1603B, and an encoder 1605B.

Figure 17:
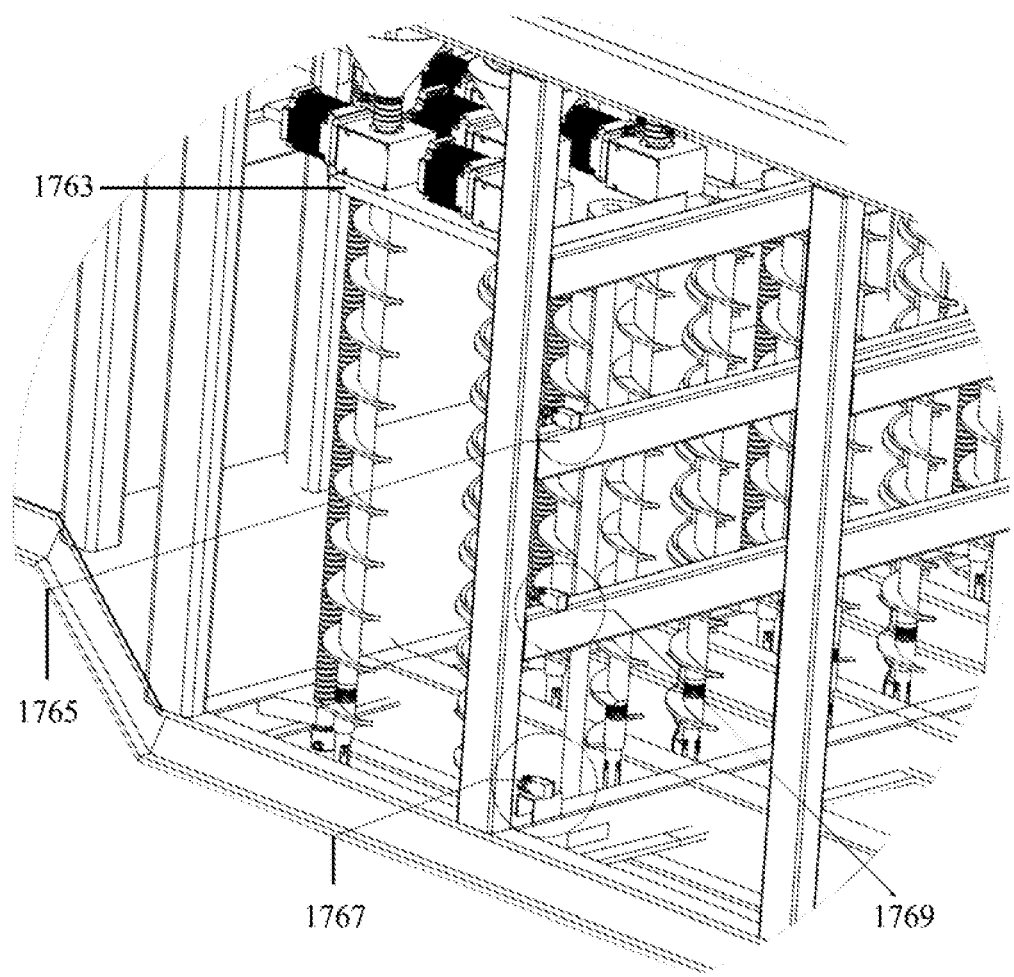
FIG. 17 illustrates a view of an exemplary view of three limit switches, in accordance with at least one embodiment.

FIG. 17 illustrates a view of an exemplary view of three limit switches, in accordance with at least one embodiment. FIG. 17 depicts an injection drill bit array platform 1703, a limit switch 1705, a limit switch 1707, and a limit switch 1709.

Figure 18A:
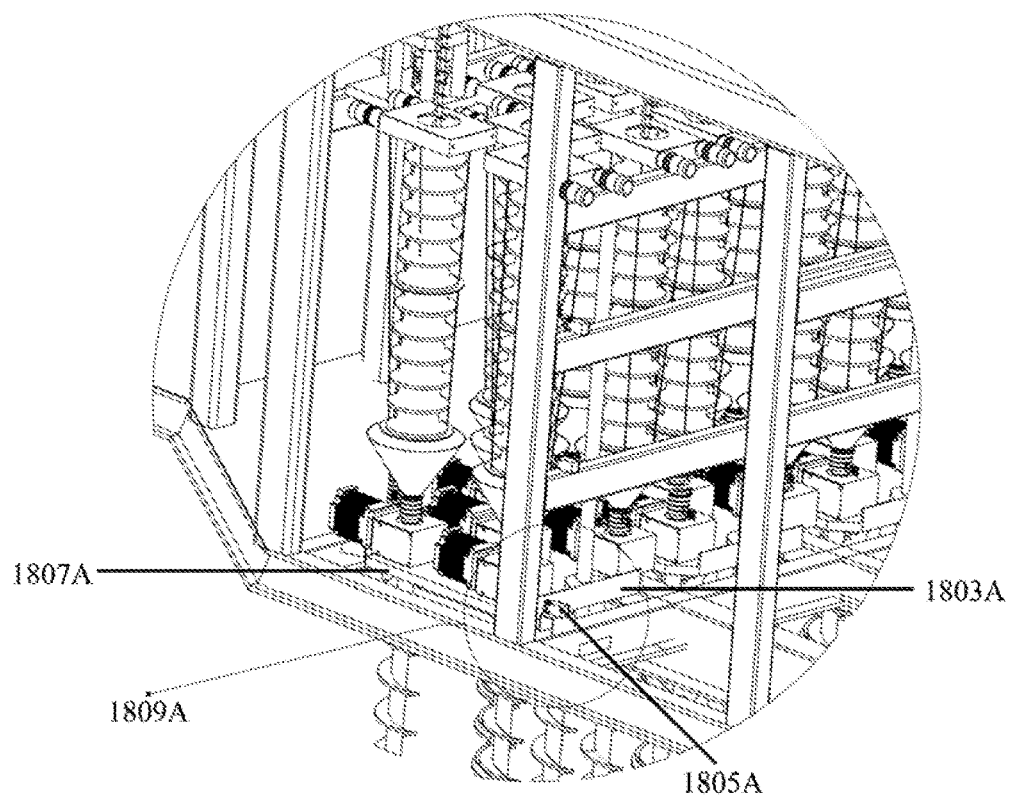
FIG. 18A illustrates a view of an exemplary limit switch that has been tripped by the Injection Drilling Array Platform having traveled to its limit setting, in accordance with at least one embodiment.

FIG. 18A illustrates a view of an exemplary limit switch that has been tripped by the Injection Drilling Array Platform having traveled to its limit setting, in accordance with at least one embodiment. FIG. 18A depicts a back wall of drilling array platform 1803A, a limit switch 1805A, a drilling array platform 1807A, and call out 1809a for close up of FIG. 10B.

Figure 18B:
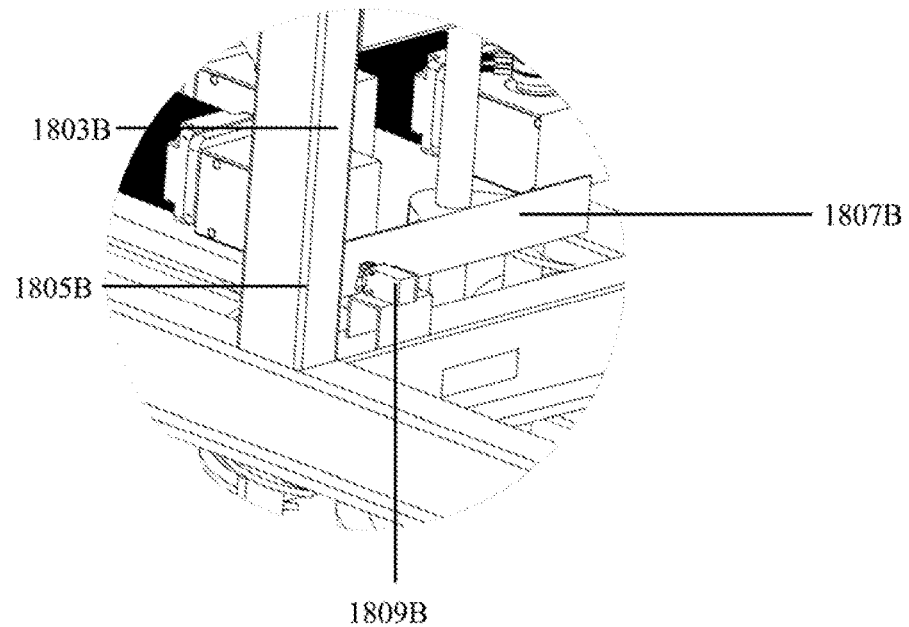
FIG. 18B illustrates a view of an exemplary is a close up of FIG. 18A, in accordance with at least one embodiment.

FIG. 18B illustrates a view of an exemplary is a close up of FIG. 18A, in accordance with at least one embodiment.

FIG. 18B depicts a close up 1803B of FIGS. 10A and 1009A, a drilling array platform 1805B, a back wall of drilling array platform 1807B, and a limit switch 1809B.

Figure 19A:
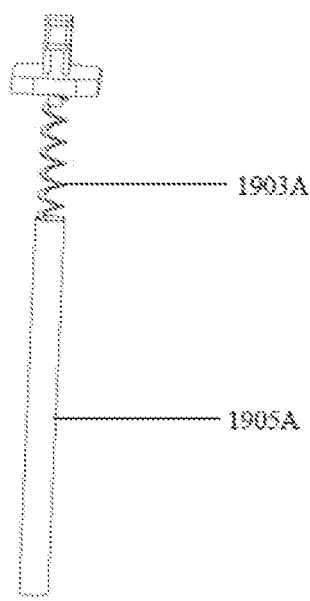
FIG. 19A illustrates an exemplary view of feeder auger flexible conveyor wire screw and conduit tube, in accordance with at least one embodiment.

FIG. 19A illustrates an exemplary view of feeder auger flexible conveyor wire screw and conduit tube, in accordance with at least one embodiment. FIG. 19A depicts a feeder auger flexible conveyor wire screw 1903A, a conduit tube 1905A, and a flight auger-feeder auger motor 1907A.

Figure 19B:
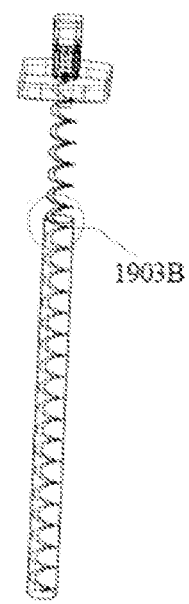
FIG. 19B illustrates an exemplary view of feeder auger flexible conveyor wire screw and transparent conduit tube, in accordance with at least one embodiment.

FIG. 19B illustrates an exemplary view of feeder auger flexible conveyor wire screw and transparent conduit tube, in accordance with at least one embodiment. FIG. 1.93 depicts a transparent conduit tube 1903A.

Figure 19C:
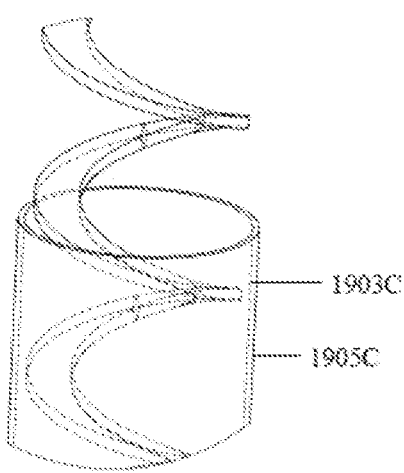
FIG. 19C illustrates a close-up view of an exemplary feeder auger flexible conveyor wire screw with a transparent conduit tube and an inner wall of hollow shaft injection drill bit, in accordance with at least one embodiment.

FIG. 19C illustrates a close-up view of an exemplary feeder auger flexible conveyor wire screw with transparent conduit tube and the inner wall of hollow shaft injection drill bit, in accordance with at least one embodiment. FIG. 19C depicts an outer dimension wall of a transparent conduit tube 1903C, and an inner dimension wall of a hollow shaft drill bit 1905C.

Figure 19D:
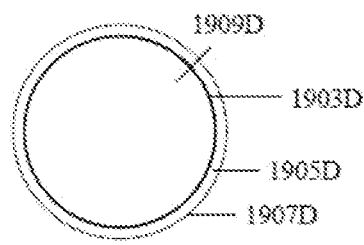
FIG. 19D illustrates a close-up view of an exemplary top view of feeder auger flexible conveyor wire screw and transparent conduit tube hollow chamber(s) for wires, in accordance with at least one embodiment.

FIG. 19D illustrates a close-up view of an exemplary top view of feeder auger flexible conveyor wire screw and transparent conduit tube hollow chamber(s) for wires, in accordance with at least one embodiment. FIG. 19D depicts an inner dimension wall of a transparent conduit tube 1903D, a cavity wire area between 1903D and 1907D wall of a transparent tube for constituents 1905D, and an outer dimension wall of a transparent tube 1907D for constituents, and a cavity 1909D for feeder auger.

Figure 19E:
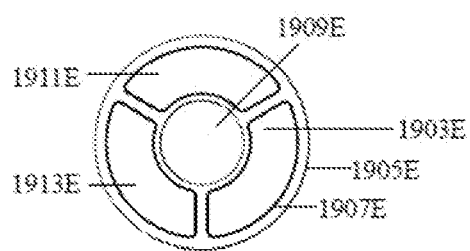
FIG. 19E illustrates a close-up view of an exemplary top view of feeder auger flexible conveyor wire screw and transparent conduit tube hollow chamber(s) for wires, in accordance with at least one embodiment.

FIG. 19E illustrates a close-up view of an exemplary top view of feeder auger flexible conveyor wire screw and transparent conduit tube hollow chamber(s) for wires, in accordance with at least one embodiment. FIG. 19E depicts a cavity wire area 1903E between 1903d and 1907d wall of a transparent tube for constituents, an outer dimension wall of a transparent tube 1905E for constituents, outer dimension wall 1907E of 1903E, a cavity 1909E for feeder auger, a cavity wire area 1911E between 1903D and 1907D wall of a transparent tube for constituents, and cavity wire area 1913E between 1903D and 1907D wall of a transparent tube for constituents.

Further, the present specification related to the hollow shaft injection drilling array (FIG. 4A) enables sequential dispensing of a plurality of constituents at targeted depths. The hollow shaft injection drilling array (FIG. 4A) includes an artificial intelligence (AI) robot (1507C); a lens (1405); a computer (1511C; a programmable logic controller (PLC) (1505C); one or more encoders (1605B); one or more limit switches (1809B); a sensor; a plurality of hollow shaft drill bits (503); a plurality of guide rail(s) (917); a plurality of matching platforms comprising elastomers (903, and 909), and granite (905): and a plurality of lead screws (913). The elastomers (903, and 909), granite (905), and the lead screws (913) enable sequential dispensing of the constituents within a plurality of different targeted depths controlled via the AI robot (1507C), the lens (1405), the computer (1511C), the PLC (1505C), the encoder (1605B), the limit switch (1809B), and the sensor. The limit switches (1809B) and the encoders (1605B) enable the hollow shaft injection drilling array (FIG. 4A) to sequence the constituents to be injected at one or more specific depths.

In an embodiment, the hollow shaft injection drilling array (FIG. 4A) enables capturing of targeted volumes of the constituents thereby creating one or more of: a mono or a poly constituent horizon through a plurality of instructions from the AI robot (1507C), the lens (1405), the computer (1511C), the PLC (1505C), the encoder (1605B), the limit switch (1809B), and the sensor.

In an embodiment, the hollow shaft injection drilling array (FIG. 4A) enables the hollow shaft drill bits (503) to be refilled with the constituents at specific depths to achieve volume efficacy through instructions from the AI robot (1507C), the lens (1405), the computer (1511), the PLC (1505C), the encoder (1605B), the limit switch (1809B), and the sensor.

In an embodiment, the hollow shaft injection drilling array (FIG. 4A) enables subsurface injection of living organisms, other micro-organisms, bacteria, fungi, gases, liquid, damp, slurry, steam, wettable, and/or dry constituents through a plurality of hollow shaft injection drill bits (FIG. 4A).

In an embodiment, the hollow shaft injection drilling array (FIG. 4A) is enabled by thermal or non-thermal imaging performed by a camera of the AI robot (1507C) and the lens (1405) to sequence the constituents to be injected at the specific depths.

In an embodiment, the hollow shaft injection drilling array (FIG. 4A) enables time interval injection by the encoder (1605B) counting a slower turn rate and adding a plurality of specific constituents to determine the volume to change soil porosity.

In an embodiment, the hollow shaft injection drilling array (FIG. 4A) injects horizontally and or horizontally during the descending and or the ascending drilling process.

In an embodiment, the hollow shaft injection drilling array (FIG. 4A) includes a plurality of hollow shaft injection drilling arrays members acting independently or in concert with other hollow shaft injection drilling arrays members during the ascending and/or descending drilling process.

In an embodiment, the lead screws (913) enable one or more hollow shaft injection drill bits (911) or a plurality of injection drill bits to act independently via instructions from the AI robot (1507C), the lens (1405), the computer (1511C), and the PLC (1505C).

In an embodiment, the hollow shaft injection drilling array (FIG. 4A) enables the hollow shaft injection drill bits (911) to individually stop drilling, or to stop at an interval of time.

In an embodiment, the hollow shaft injection drilling array (FIG. 4A) enables the hollow shaft injection drill bits (911) with a plurality of segmented platforms and the lead screws (913) to individually stop drilling or not drill at a GPS coordinate (1513C), or to stop at a specific depth. In an embodiment, the segmented platforms are capable of operating as one platform—in motion or turning on or off a drill or drill fixture.

In an embodiment, the hollow shaft injection drilling array (FIG. 4A) enables the hollow shaft injection drill bits (911) to individually stop drilling upon slowed revolutions of the encoder (1605B) detection indicating specified resistance.

In an embodiment, the hollow shaft injection drilling array (FIG. 4A) enables via the AI robot (1507C), the lens (1405), the computer (1511C), the PLC (1505C). Lidar database, and/or other subsurface map overlay to detect specified impediments and or prescribe subsurface actions.

In an embodiment, the hollow shaft injection drilling array (FIG. 4A) enables via the encoder (1605B) data inference for the AI robot (1507C), the lens (1405), the computer (1511C), the PLC (1505C), and the ternary database of soil type porosity and tightness dynamically interpreting revolution speed resistance to the hollow shaft injection drill bits (911).

In an embodiment, the hollow shaft injection drilling array (FIG. 4A) enables the database of soil type and/or existing core sample data to dynamically interact with the hollow shaft injection drill bit motor (915) to protect it from damage.

In an embodiment, the hollow shaft injection drilling array (FIG. 4A) enables dynamic sample recording of information to the AI robot (1507C), the lens (1405), the computer (1511C), the PLC (1505C), the encoder (1605B), the limit switch (1809B) and/or the sensor or a satellite communications dish (1503A) of specific depth at the GPS (1513C) location including date stamp and record of injections.

In an embodiment, the hollow shaft injection drilling array (FIG. 4A) enables the dynamic recording of information to the AI robot (1507C), the lens (1405), the computer (1511C), the PLC (1505C), the encoder (1605B), the limit switch (1809B) and/or one or more types of sensors with or without a satellite communications dish (1503A) to achieve a plan of specific depth and volume dispensed of specific constituent at the GPS (1513C) location including date stamp and record of injections.

In an embodiment, the hollow shaft injection drilling array (FIG. 4A) enables subsurface instrument and/or sensor introduction and recordation through the hollow shaft injection drill bits (911), one or more apertures (303A) of the hollow shaft injection drill bits (911) and/or a plurality of perforations (413A) to take specific readings.

In an embodiment, the hollow shaft injection drilling array (FIG. 4A) enables electrical current for a plurality of devices through a plurality of hollow shaft channels (space between outside dimensions and interior dimensions of the shaft, tubes, and conduits), an example is a space between outer dimension wall of a conduit tube and inner dimension wall of the hollow shaft injection drill bit.

In an embodiment, the hollow shaft injection drilling array (FIG. 4A) enables the insertion of a measurement, scanning, and or photographic or ultrasound device, through the AI Robot with a camera device (1405) that is capable of performing through a perforation (1113) and/or the apertures (303A).

In an embodiment, the hollow shaft injection drill bits (911) include the matching platforms the lead screws (913), and the guide rail(s) (917) configured within the hollow shaft injection drilling array to independently be controlled by the AI robot (1507C), the lens (1405), the computer (1511C), the PLC (1505C), the Lidar database and/or other subsurface map overlay to prescribe subsurface actions for maximum or minimum depth based on constituent prescription.

In an embodiment, the hollow shaft injection drilling array (FIG. 4A) enables one or many exterior surfaces of a hollow shaft drill bit (1115) to be a carrier of the constituents for sub-surface kinetic release.

In an embodiment, the hollow shaft injection drilling array (FIG. 4A) enables the one or more exterior surfaces or perforation(s) (1113) cavity(ies) of the hollow shaft drill bit (1115) to be coated and/or filled with adhesives and or then with abrasives to mitigate smearing by kinetic force and/or by ejection.

In an embodiment, the hollow shaft injection drilling array (FIG. 4A) is limited to the depth at a specific GPS (1513C) location.

In an embodiment, the hollow shaft injection drilling array (FIG. 4A) is turned off at specific GPS (1513C) locations.

In an embodiment, the individual hollow shaft injection drilling arrays members' features such as blending wings are turned off at specific GPS (1513C) locations or mechanically if they share a platform and lead screw.

In an embodiment, the matching platforms and/or the lead screws (609B) generate vibration and torque that are dampened by granite (905) or other adsorbing rock and or aggregate formed material and/or by layered elastomers (903, and 909), and/or friction springs (7098) and/or by other friction springs (605B, and 607B), and a disc coupling between the matching platform and gearbox(es) where each drill within the array comprising and/or is associated with a gearbox interface.

In an embodiment, the vibration and torque generated upon the guide rails are dampened by friction springs (709B).

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A
113A Call out for close-up of FIG. 1B of injection drilling screw with collar and bayonet claw
FIG. 1B
103B Injection Drilling Screw
105B Collar
107B Bayonet Claw
FIG. 2A
203A Call out for a close-up seen in FIG. 2B of a side view of the bottom of the Screw Injection Drill with a Hollow Shaft
205A Gear Box
207A Hopper for feeder auger
209A Motor
211A Screw Injection Drill with Hollow Shaft
FIG. 2B
203B Injection Drilling Screw with Hollow Shaft and without perforations
205B Protective Collar for Constituents within Shaft
207B Bayonet Claw Drill Bit
FIG. 3
303 Electro Magnetic Spring for Hollow Shaft
305 Bayonet Claw
307 Collar Teeth
309 Collar
311 Tapered Injection Drill Screw
FIG. 4A
403A Call out of a close-up as seen in FIG. 4B of a perforated injection drill bit with a Hollow Shaft capped by bayonet claws with Shaft perforations
405A Gear Box
407A Hopper for feeder auger
409A Motor
411A Array Platform
413A Injection Drill Bit perforations
415A Auger Screw
FIG. 4B
403B Perforations
405B Auger Screw
407B End Cap
409B Bayonet Claw
411B Hollow Shaft
FIG. 5
503 a hollow shaft injection drill bit
FIG. 6A
603A Lead Screw Damping Platform
FIG. 6B
603B Horizontal Friction Spring Damping Unit
605B Lead Screw Motor
607B Friction Spring
609B Lead Screw
611B Damping Platform
FIG. 7A
703A Top Plate
705A Mounting Bracket
707A Bottom Housing Plate
FIG. 7B
703B Top Plate
705B Bearing Block
707B Bottom Plate
709B Friction Spring
FIG. 8
803 Injection Drilling Bit Array with Damping Platform
FIG. 9
903 Elastomer
905 Granite
907 Friction Spring
909 Elastomer
911 Hollow Shaft Injection Drill Bit
913 Lead Screw
915 Hollow Shaft Injection Drill Bit Motor
FIG. 10
1005 Quick Connect Disconnect Feature
1007 Changeable Drill Bit Tip
FIG. 11
1105 Pressure Conduit
1107 Female Quick Release
1109 Male Quick Release
1113 Single Drill Injection Bit Screw Thread
1115 Single Drill Injection Bit Screw Hexagon Perforation
FIG. 12
1203 Quick Connect Process Diagram
FIG. 13A
1305A PLC
FIG. 13B
1303B PLC
1305B AI Robot
FIG. 14
1403 Communications Antenna
1405 Robot Sensor Eye and Camera
1407 Gimbal
FIG. 15A
1503A Satellite Communications Dish
1505A Communications Platform containing components seen in FIG. 14C
FIG. 15B
1503B Satellite Communications Dish
FIG. 15C
1503C Fuel Cell
1505C PLC
1507C AI Robot
1509C Router
1511C Computer
1513C GPS
FIG. 16A

1603A Lead Screw
1605A Encoder
FIG. 16B
1603B Lead Screw
1605B Encoder
FIG. 17
1703 Injection Drill Bit Array Platform
1705 Limit Switch
1707 Limit Switch
1709 Limit Switch
FIG. 18A
1803A Back Wall of Drilling Array Platform
1805A Limit Switch
1807A Drilling Array Platform
1809A Call Out for Close Up of FIG. 10B
FIG. 18B
1803B Close Up of FIG. 10A and #1009A
1805B Drilling Array Platform
1807B Back Wall of Drilling Array Platform
1809B Limit Switch
FIG. 19A
1903A Feeder Auger Flexible Conveyor Wire Screw
1905A Conduit Tube
1907A Flight Auger-Feeder Auger Motor
FIG. 19B
1903B Transparent Conduit Tube
FIG. 19C
1903C Outer Dimension Wall of a Transparent Conduit Tube
1905C Inner Dimension Wall of a Hollow Shaft Drill Bit
FIG. 19D
1903D Inner Dimension Wall of a Transparent Conduit Tube
1905D Cavity Wire Area between #1903D and #1907D Wall of a Transparent Tube for Constituents
1907D Outer Dimension Wall of a Transparent Tube for Constituents
1909D Cavity for Feeder Auger
FIG. 19E
1903E Cavity Wire Area between #1903D and #1907D Wall of a Transparent Tube for Constituents
1905E Outer Dimension Wall of a Transparent Tube for Constituents
1907E Outer Dimension Wall of #1903E
1909E Cavity for Feeder Auger
1911E Cavity Wire Area between #1903D and #1907D Wall of a Transparent Tube for Constituents
1913E Cavity Wire Area between #1903D and #1907D Wall of a Transparent Tube for Constituents

The invention claimed is:

1. A hollow shaft injection drilling array to enable sequential dispensing of a plurality of constituents at targeted depths, comprising:
an artificial intelligence (AI) robot;
a lens;
a computer;
a programmable logic controller (PLC);
one or more encoders;
one or more limit switches;
a sensor;
a plurality of hollow shaft drill bits;
a plurality of guide rail(s);
a plurality of matching platforms comprising elastomers, and granite; and
a plurality of lead screws,
wherein the elastomers, granite, and the lead screws enable sequential dispensing of the constituents within a plurality of different targeted depths controlled via the AI robot, the lens, the computer, the PLC, the encoder, the limit switch, and the sensor,
wherein the limit switches and the encoders enable the hollow shaft injection drilling array to sequence the constituents to be injected at one or more specific depths.

2. The hollow shaft injection drilling array as claimed in claim 1 enables capturing of targeted volumes of the constituents thereby creating one or more of: a mono or a poly constituent horizon through a plurality of instructions from the AI robot, the lens, the computer, the PLC, the encoder, the limit switch, and the sensor.

3. The hollow shaft injection drilling array as claimed in claim 1 enables the hollow shaft drill bits to be refilled with the constituents at specific depths to achieve volume efficacy through instructions from the AI robot, the lens, the computer, the PLC, the encoder, the limit switch, and the sensor.

4. The hollow shaft injection drilling array as claimed in claim 1 enables subsurface injection of living organisms, other micro-organisms, bacteria, fungi, gases, liquid, damp, slurry, steam, wettable, and/or dry constituents through a plurality of hollow shaft injection drill bits.

5. The hollow shaft injection drilling array as claimed in claim 1 enabled by thermal or non-thermal imaging performed by a camera of the AI robot and the lens to sequence the constituents to be injected at the specific depths.

6. The hollow shaft injection drilling array as claimed in claim 1 enables time interval injection by the encoder counting a slower turn rate and adding a plurality of specific constituents to determine the volume to change soil porosity.

7. The hollow shaft injection drilling array as claimed in claim 1 injects horizontally and/or horizontally during the descending and or the ascending drilling process.

8. The hollow shaft injection drilling array as claimed in claim 1 comprises a plurality of hollow shaft injection drilling arrays members acting independently or in concert with other hollow shaft injection drilling arrays members during the ascending and/or descending drilling process.

9. The hollow shaft injection drilling array as claimed in claim 1, wherein the lead screws enable one or more hollow shaft injection drill bits or a plurality of injection drill bits to act independently via instructions from the AI robot, the lens, the computer, and the PLC.

10. The hollow shaft injection drilling array as claimed in claim 1 enables the hollow shaft injection drill bits to individually stop drilling, or to stop at an interval of time.

11. The hollow shaft injection drilling array as claimed in claim 1 enables the hollow shaft injection drill bits with a plurality of segmented platforms and the lead screws to individually stop drilling or not drill at a GPS coordinate, or to stop at a specific depth.

12. The hollow shaft injection drilling array as claimed in claim 1 enables the hollow shaft injection drill bits to individually stop drilling upon slowed revolutions of the encoder detection indicating specified resistance.

13. The hollow shaft injection drilling array as claimed in claim 1 enables via the AI robot, the lens, the computer, the PLC, Lidar database, and/or other subsurface map overlay to detect specified impediments and or prescribe subsurface actions.

14. The hollow shaft injection drilling array as claimed in claim 1 enables via the encoder data inference for the AI robot, the lens, the computer, the PLC, and the ternary database of soil type porosity and tightness dynamically interpreting revolution speed resistance to the hollow shaft injection drill bits.

15. The hollow shaft injection drilling array as claimed in claim 1 enables the database of soil type and/or existing core sample data to dynamically interact with the hollow shaft injection drill bit motor to protect it from damage.

16. The hollow shaft injection drilling array as claimed in claim 1 enables dynamic sample recording of information to the AI robot, the lens, the computer, the PLC, the encoder, the limit switch and/or the sensor or a satellite communications dish of specific depth at the GPS location including date stamp and record of injections.

17. The hollow shaft injection drilling array as claimed in claim 1 enables dynamic recording of information to the AI robot, the lens, the computer, the PLC, the encoder, the limit switch and/or one or more types of sensors with or without a satellite communications dish to achieve a plan of specific depth and volume dispensed of specific constituent at the GPS location including date stamp and record of injections.

18. The hollow shaft injection drilling array as claimed in claim 1 enables subsurface instrument and/or sensor introduction and recordation through the hollow shaft injection drill bits, one or more apertures of the hollow shaft injection drill bits and/or a plurality of perforations to take specific readings.

19. The hollow shaft injection drilling array as claimed in claim 1 enables electrical current for a plurality of devices through a plurality of hollow shaft channels (space between outside dimensions and interior dimensions of the shaft, tubes, and conduits), an example is a space between outer dimension wall of a conduit tube and inner dimension wall of the hollow shaft injection drill bit.

20. The hollow shaft injection drilling array as claimed in claim 1 enables the insertion of a measurement, scanning, and or photographic or ultrasound device, through the AI Robot with a camera device that is capable of performing through a perforation and/or the apertures.

21. The hollow shaft injection drilling array as claimed in claim 1, wherein the hollow shaft injection drill bits comprising the matching platforms the lead screws, and the guide rail(s) configured within the hollow shaft injection drilling array to independently be controlled by the AI robot, the lens, the computer, the PLC, the Lidar database and/or other subsurface map overlay to prescribe subsurface actions for maximum or minimum depth based on constituent prescription.

22. The hollow shaft injection drilling array as claimed in claim 1 enables one or many exterior surfaces of a hollow shaft drill bit to be a carrier of the constituents for subsurface kinetic release.

23. The hollow shaft injection drilling array as claimed in claim 1 enables the one or more exterior surfaces or perforation(s) cavity of the hollow shaft drill bit to be coated and/or filled with adhesives and or then with abrasives to mitigate smearing by kinetic force and/or by ejection.

24. The hollow shaft injection drilling array as claimed in claim 1 is limited to the depth at a specific GPS location to be turned off or remain on.

25. The hollow shaft injection drilling array as claimed in claim 1, wherein the individual hollow shaft injection drilling arrays members features such as blending wings are turned off at specific GPS locations or mechanically if they share a platform and lead screw.

26. The hollow shaft injection drilling array as claimed in claim 1, wherein the matching platforms and/or the lead screws generate vibration and torque that are dampened by granite or other adsorbing rock and or aggregate formed material and/or by layered elastomers, and/or friction springs and/or by other friction springs, and a disc coupling between the matching platform and gearbox(es) where each drill within the array comprising and/or is associated with a gearbox interface.

27. The hollow shaft injection drilling array as claimed in claim 1, wherein the vibration and torque generated upon the guide rails are dampened by friction springs.

\* \* \* \* \*